United States Patent
Pettey

(10) Patent No.: US 6,296,112 B1
(45) Date of Patent: Oct. 2, 2001

(54) COMPACT DISC FOLDER BOOKLET

(75) Inventor: Thomas J. Pettey, Wayne, IL (US)

(73) Assignee: White Thorn, L.L.C., Carol Stream, IL (US)

( * ) Notice: Subject to any disclaimer, the term of this patent is extended or adjusted under 35 U.S.C. 154(b) by 0 days.

(21) Appl. No.: 08/962,376

(22) Filed: Oct. 31, 1997

Related U.S. Application Data

(63) Continuation-in-part of application No. 08/821,337, filed on Mar. 20, 1997, which is a continuation-in-part of application No. 08/753,221, filed on Nov. 21, 1996, now Pat. No. 5,669,491.

(51) Int. Cl.[7] .................................................. B65D 85/87
(52) U.S. Cl. ........................................ 206/232; 206/308.1
(58) Field of Search ................................. 206/232, 308.1, 206/309, 311, 312, 313, 387.13

(56) References Cited

U.S. PATENT DOCUMENTS

| | | |
|---|---|---|
| 470,861 | 3/1892 | Chichester . |
| 903,232 * | 11/1908 | Rosenthal ............................. 206/311 |
| 2,345,230 | 3/1944 | Bender . |
| 2,435,856 | 2/1948 | Weingart . |
| 2,523,129 * | 9/1950 | Maier ................................... 206/232 |
| 3,372,858 | 3/1968 | Brody . |
| 3,592,381 | 7/1971 | Brody . |
| 3,722,564 * | 3/1973 | Croon ................................... 206/311 |
| 3,858,792 | 1/1975 | Voligurt . |
| 4,199,061 * | 4/1980 | Harkleroad et al. ............. 206/313 X |
| 4,488,737 | 12/1984 | Jacobs et al. . |
| 4,588,321 | 5/1986 | Egly . |
| 4,640,413 * | 2/1987 | Kaplan et al. .................... 206/312 X |
| 4,709,812 | 12/1987 | Kosterka . |
| 4,793,477 | 12/1988 | Manning et al. . |
| 4,832,191 | 5/1989 | Gerver et al. . |
| 4,850,731 | 7/1989 | Youngs . |
| 4,852,740 | 8/1989 | Sellar et al. . |
| 4,905,831 | 3/1990 | Bagdis et al. . |
| 5,048,681 | 9/1991 | Hojkel . |
| 5,085,318 | 2/1992 | Leverick . |
| 5,101,973 | 4/1992 | Martinez . |
| 5,147,036 | 9/1992 | Jacobs . |
| 5,154,284 | 10/1992 | Starkey . |
| 5,170,889 * | 12/1992 | Cue ..................................... 206/232 |
| 5,193,681 | 3/1993 | Lieusay . |
| 5,207,717 | 5/1993 | Manning et al. . |
| 5,248,032 | 9/1993 | Sheu et al. . |
| 5,318,222 | 6/1994 | Bartlett . |
| 5,369,106 | 11/1994 | Baker et al. . |
| 5,422,875 | 6/1995 | Bribach . |
| 5,460,265 | 10/1995 | Kiolbasa . |
| 5,462,160 | 10/1995 | Youngs . |
| 5,472,083 | 12/1995 | Robinson et al. . |
| 5,590,912 | 1/1997 | Stevens . |
| 5,669,491 | 9/1997 | Pettey . |
| 5,713,605 | 2/1998 | Pace et al. . |

FOREIGN PATENT DOCUMENTS 8702565  10/1987  (NL) .

OTHER PUBLICATIONS

American On–Line CD–Rom, diskette holder 1996.
American On–Line folder style CD–Rom holder 1997.

* cited by examiner

*Primary Examiner*—Sam Rimell
(74) *Attorney, Agent, or Firm*—Vedder Price Kaufman & Kammholz

(57) ABSTRACT

A compact disc folder in the form of a booklet is disclosed which has two multi-page booklet portion held between two opposing panels of a cover portion. The front panel of the cover portion includes a pocket formed thereon in opposition to the booklet portion that receives a compact disc therein. The two booklet portions are held on opposite sides of a spine of the folder and are divided by way of a divider portion that is an extension of the rear cover panel of the cover portion.

18 Claims, 13 Drawing Sheets

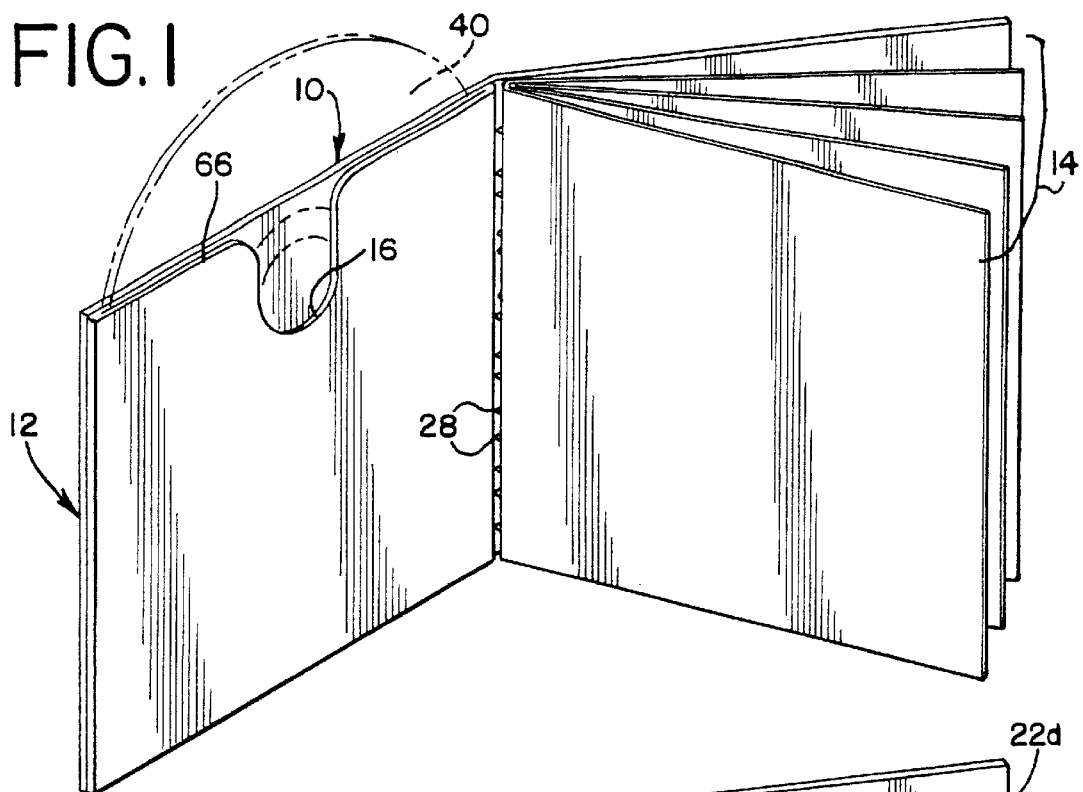
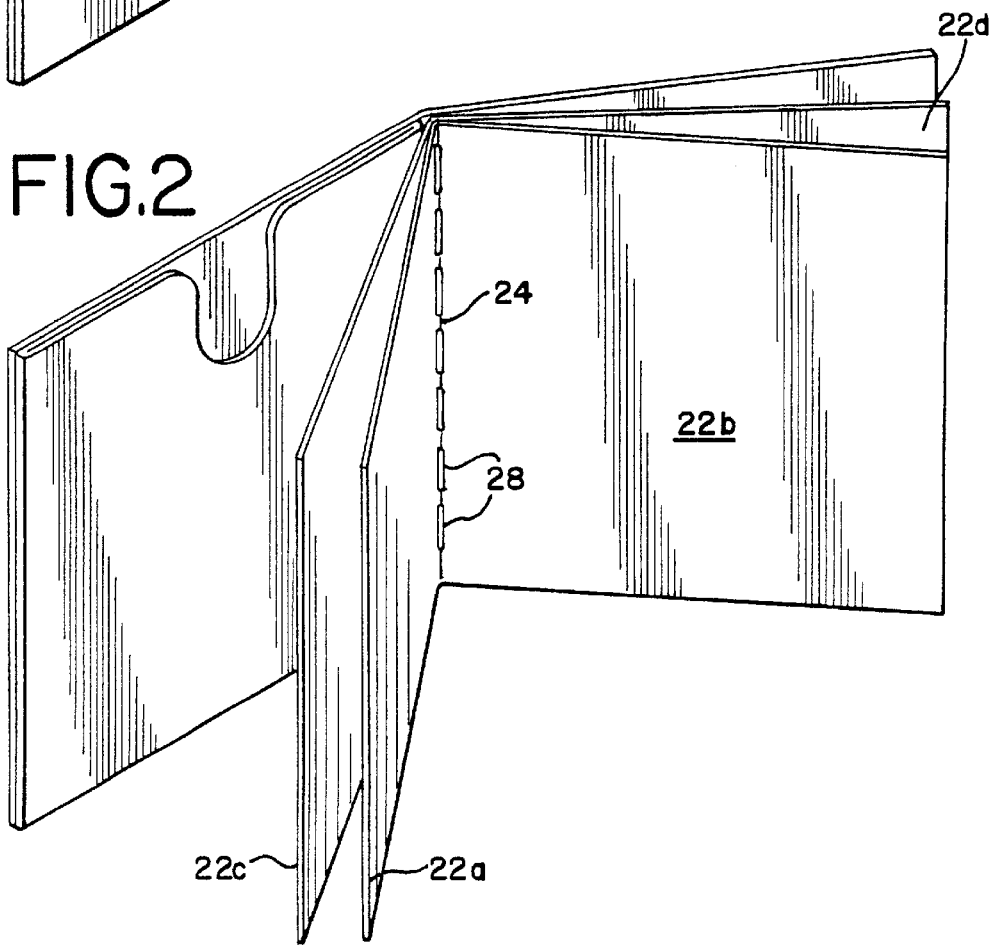

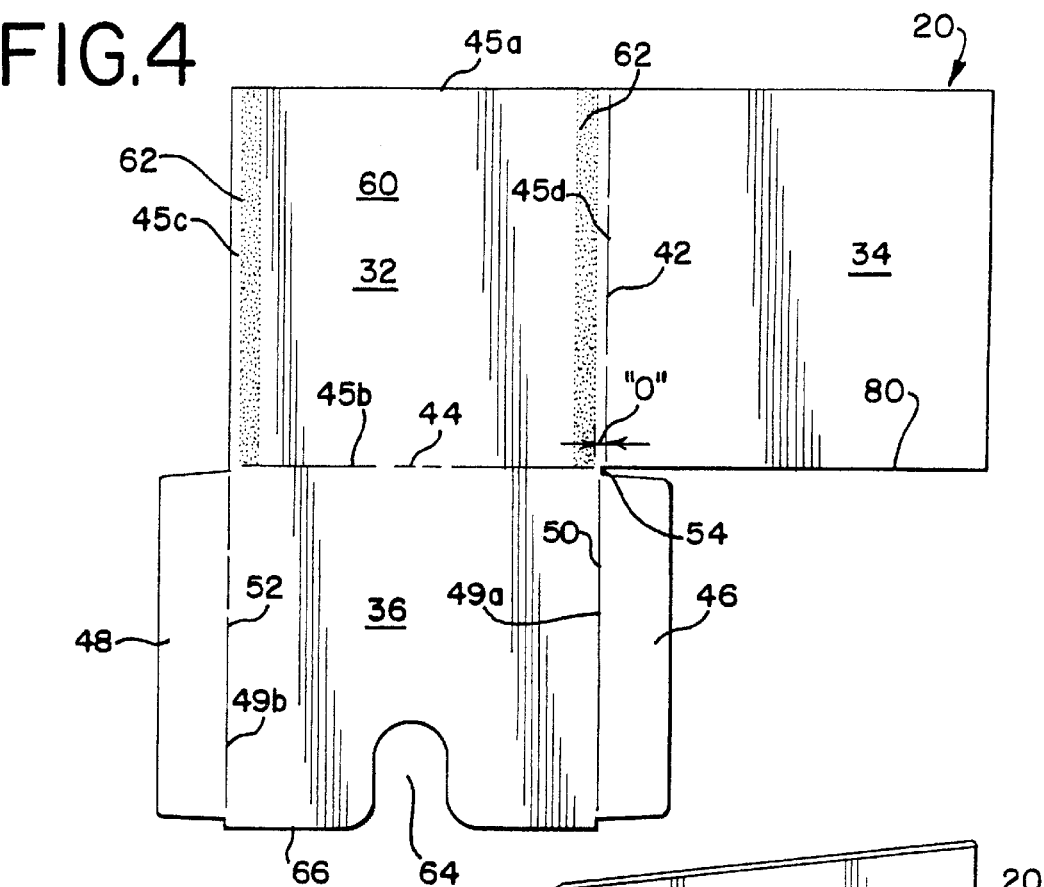
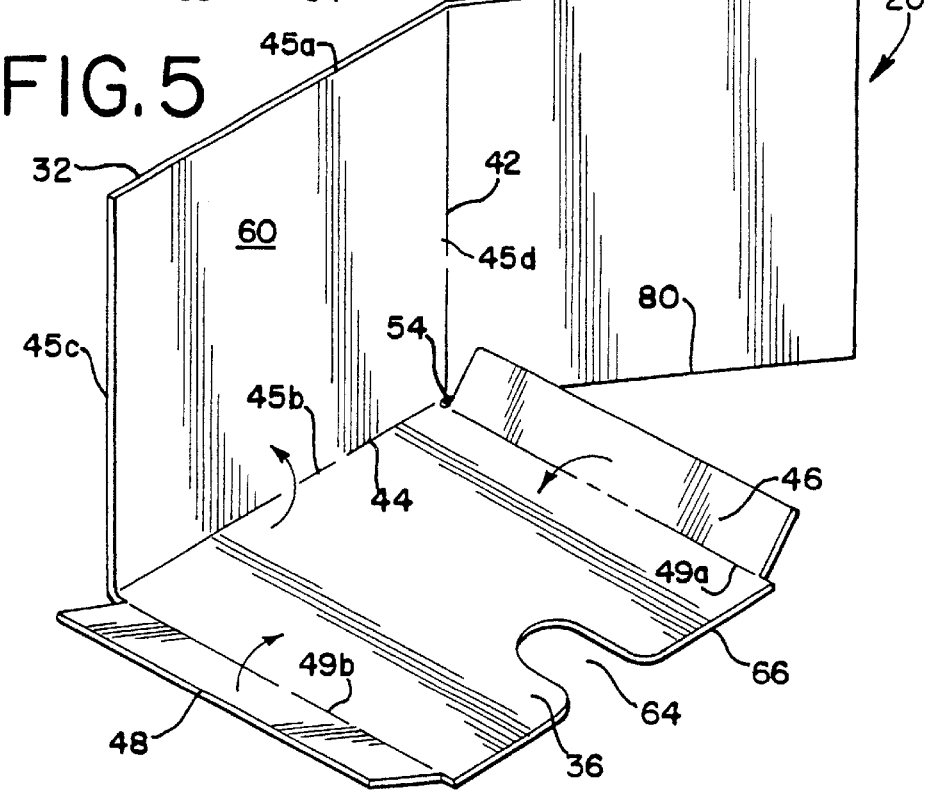

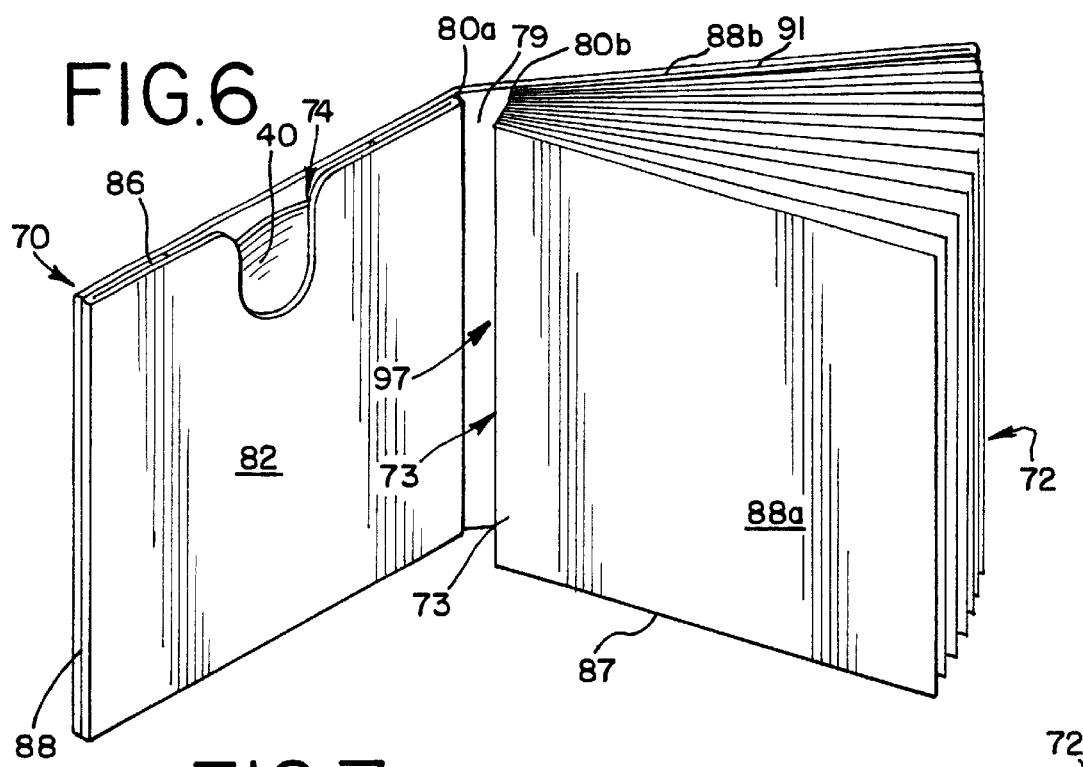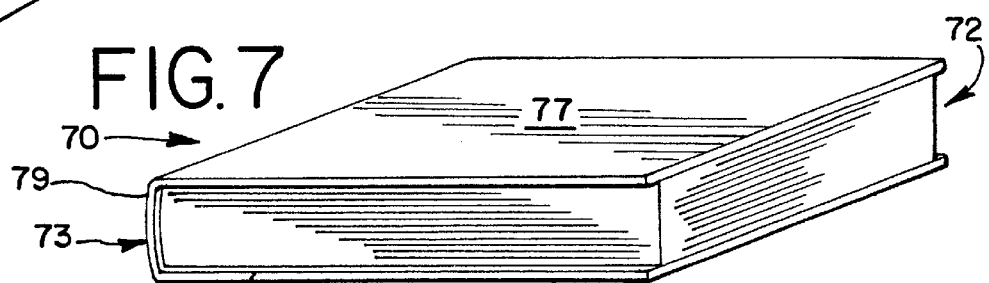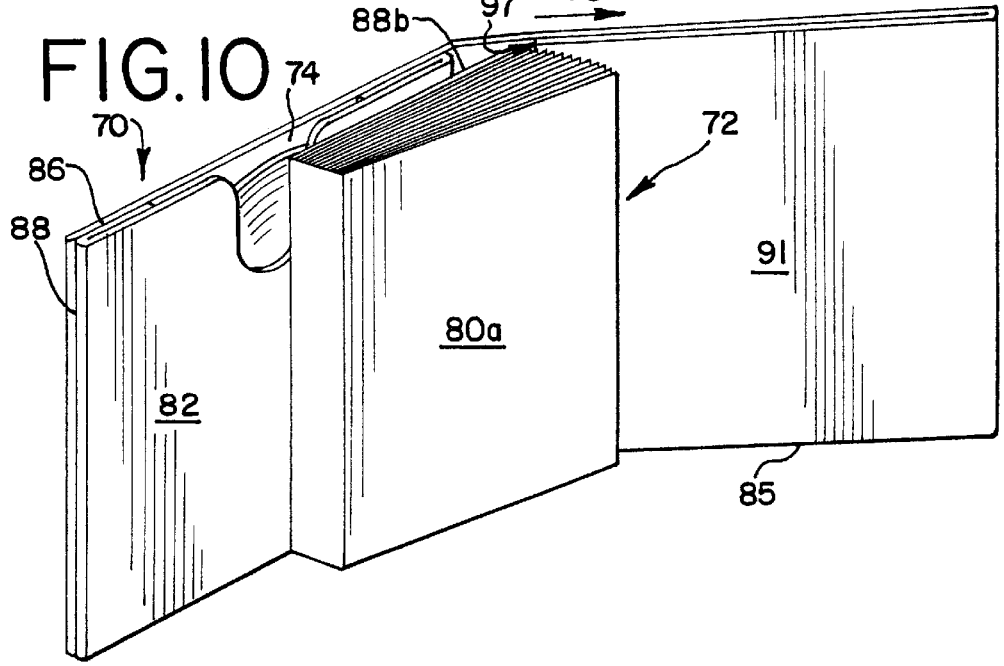

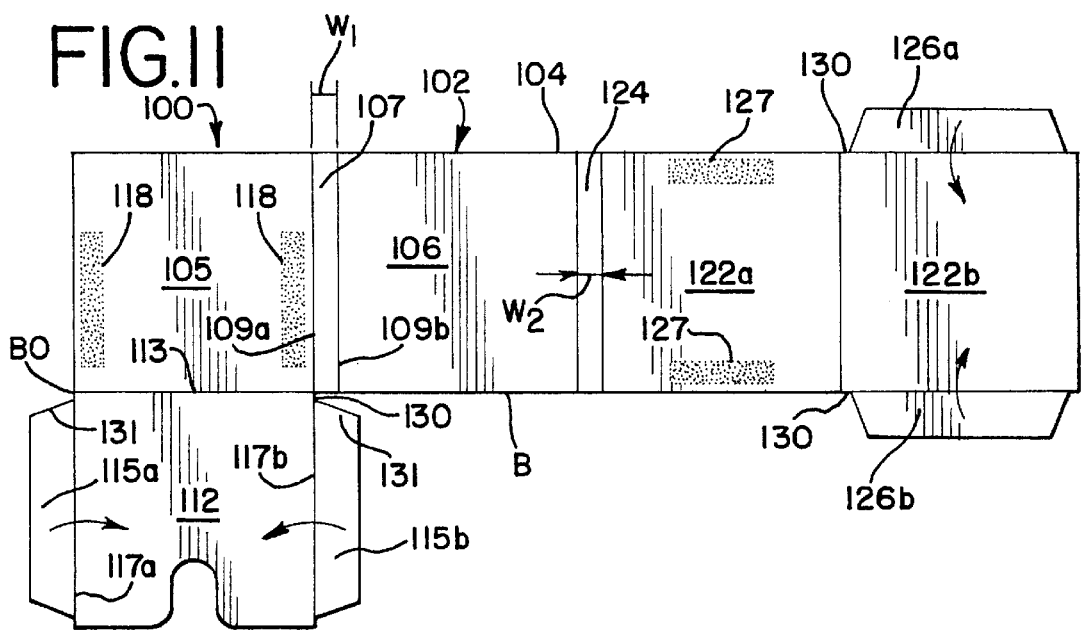
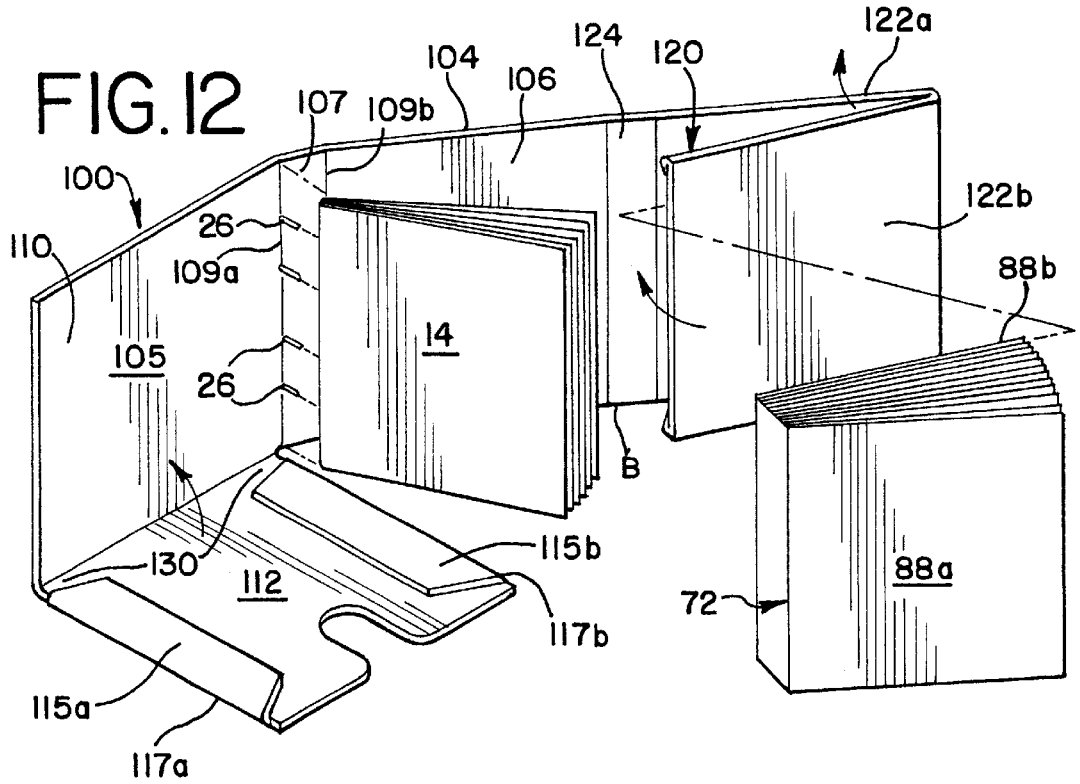

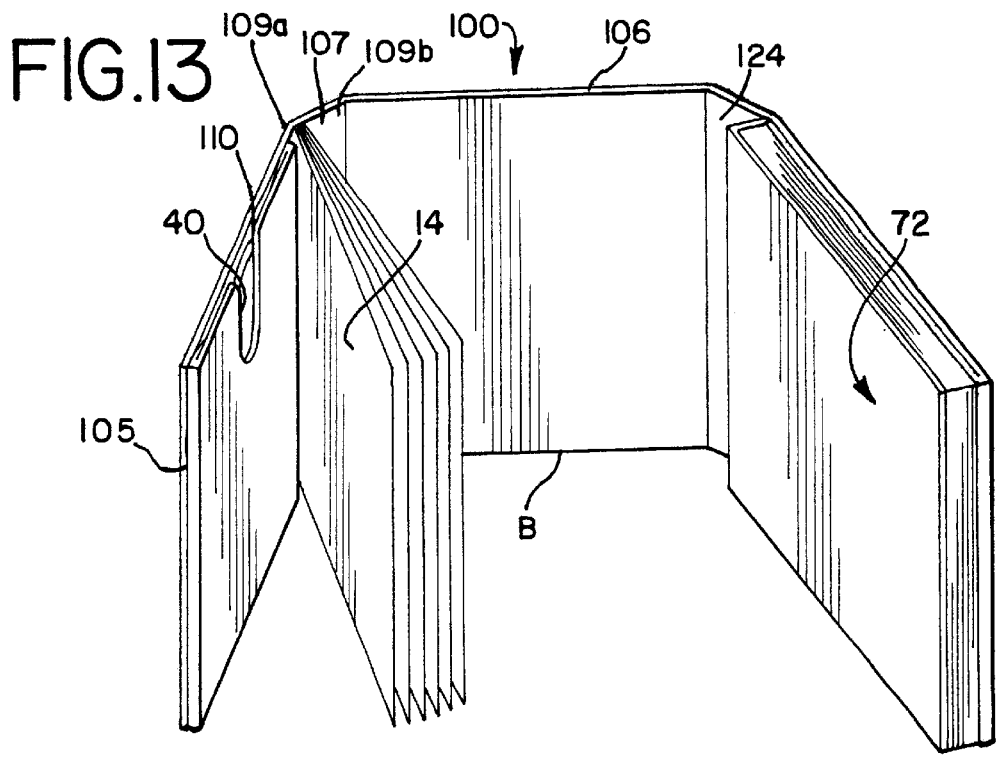
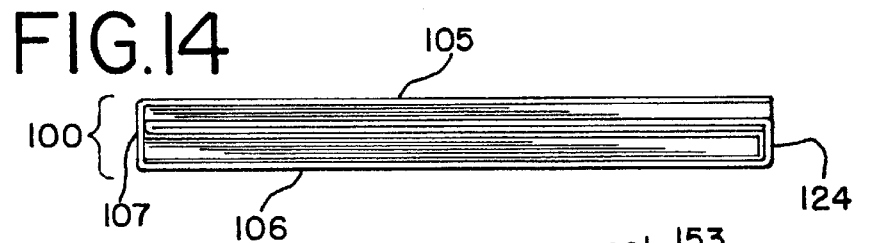
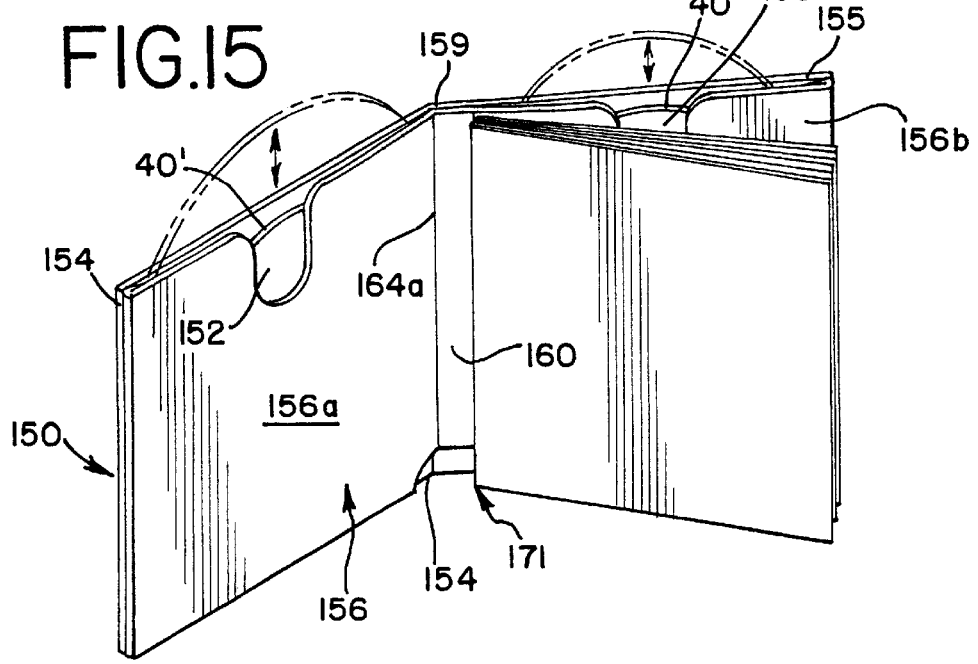

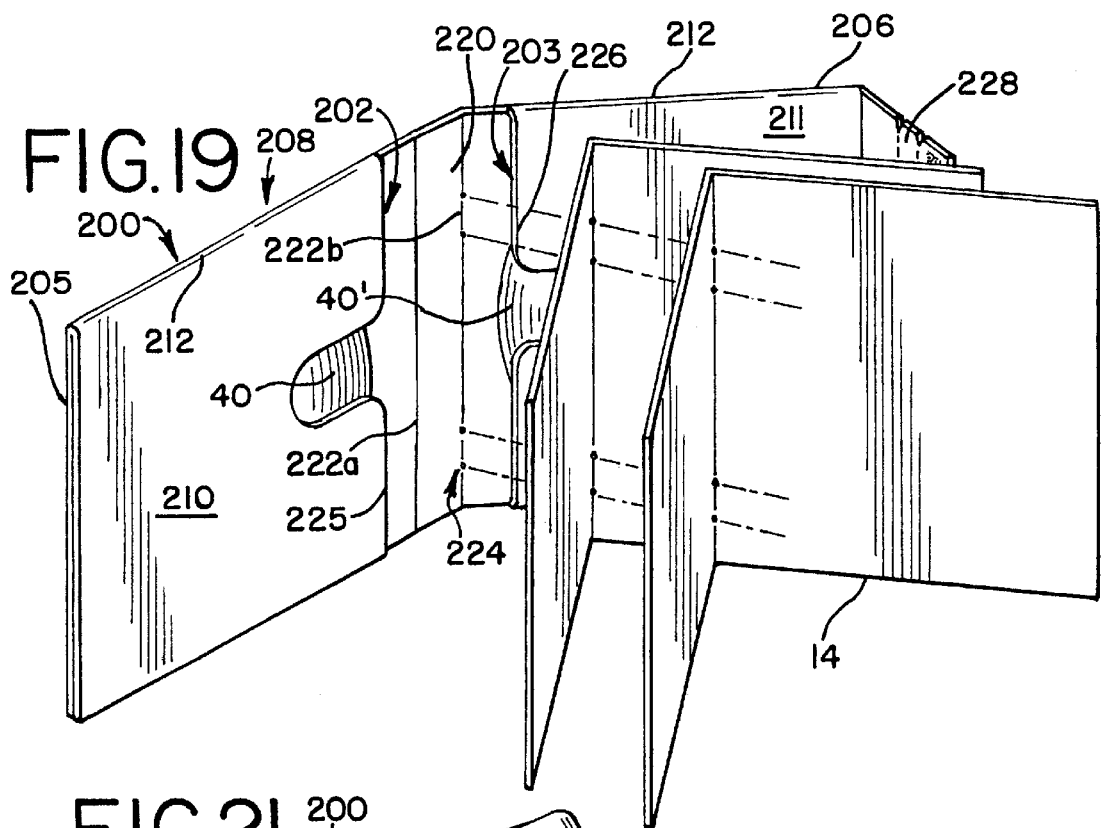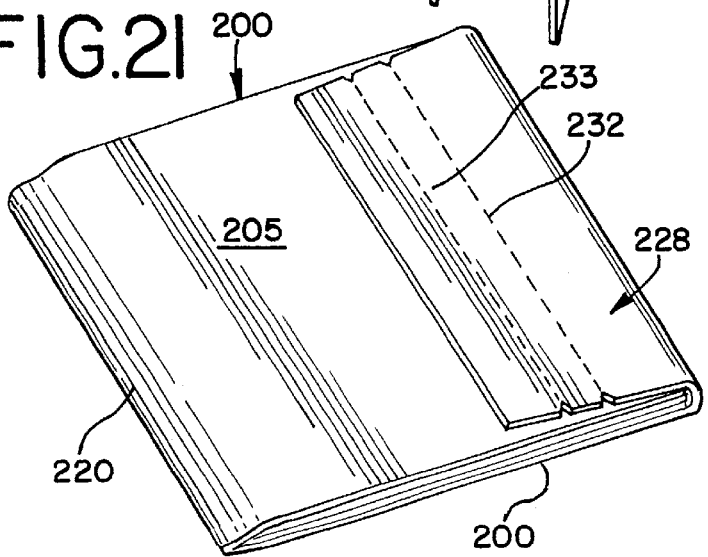

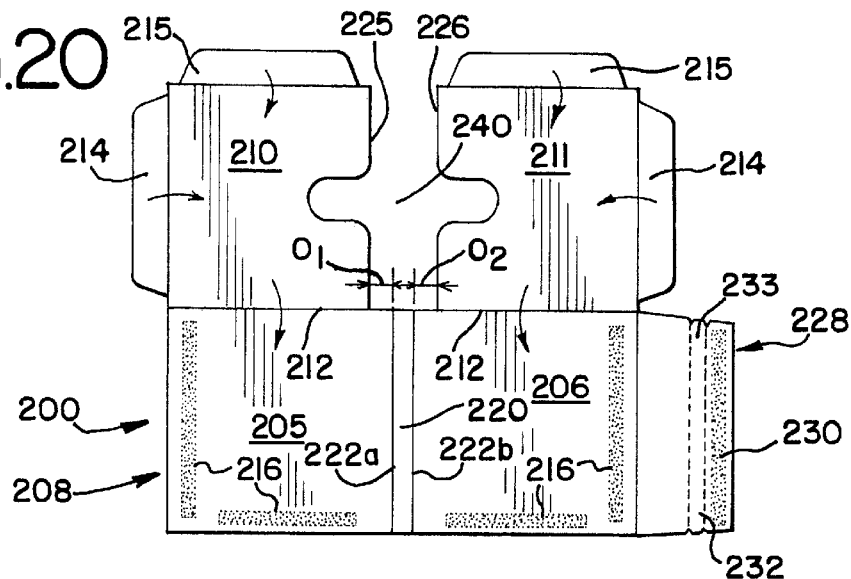
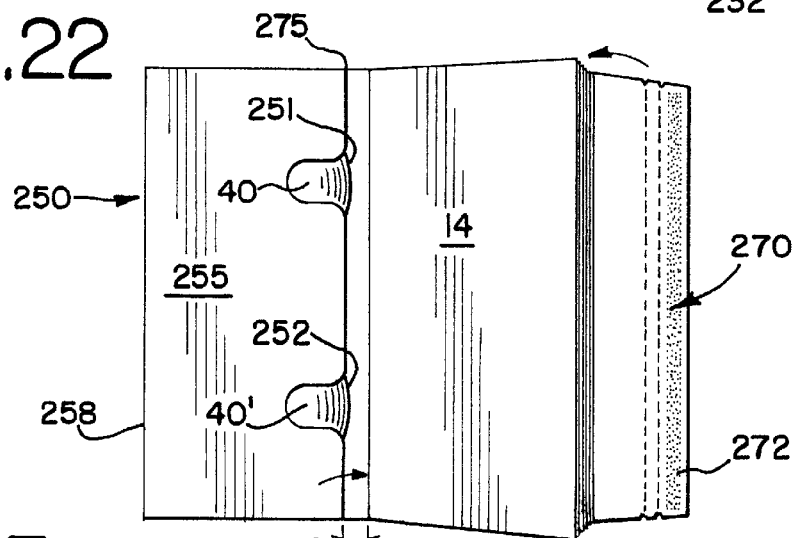
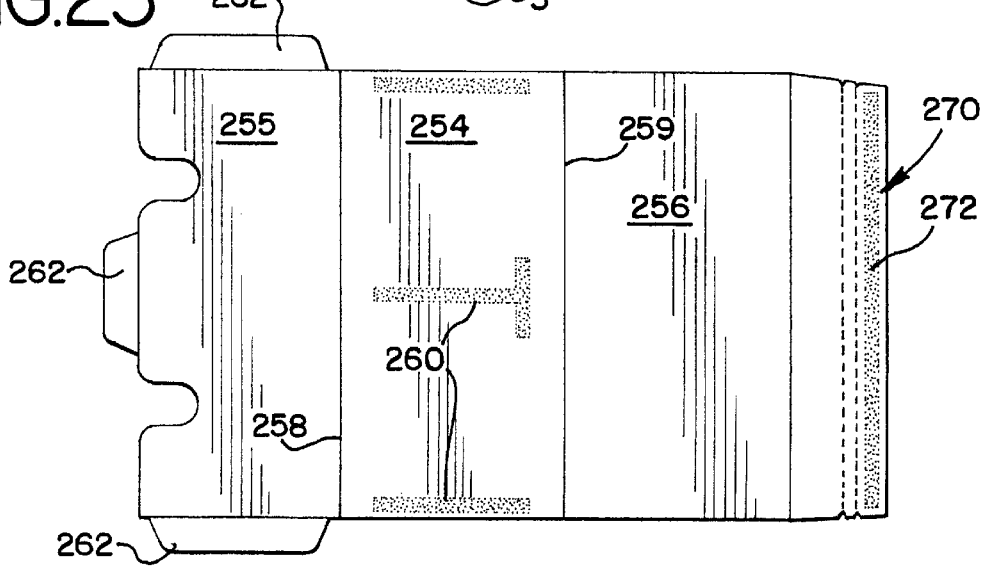

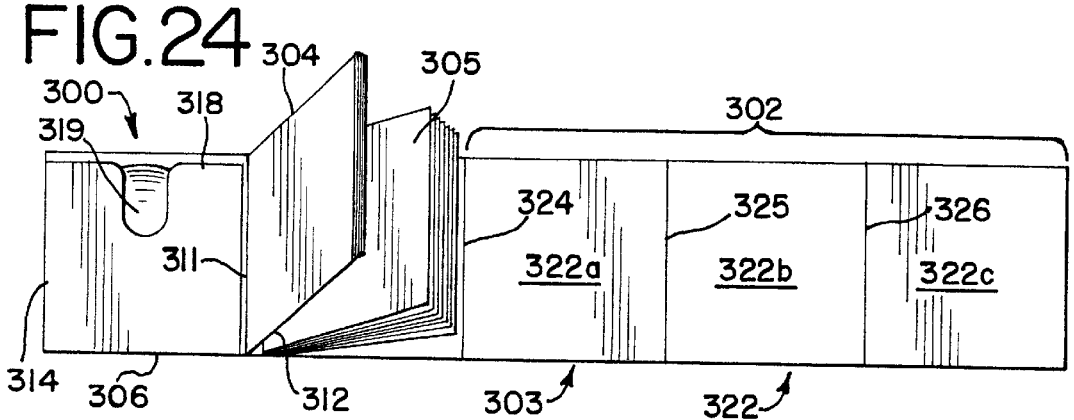
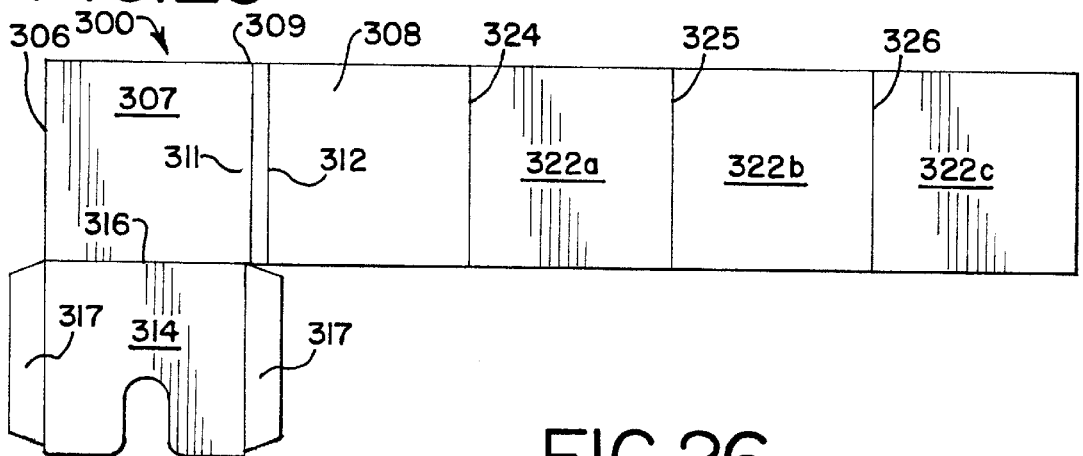
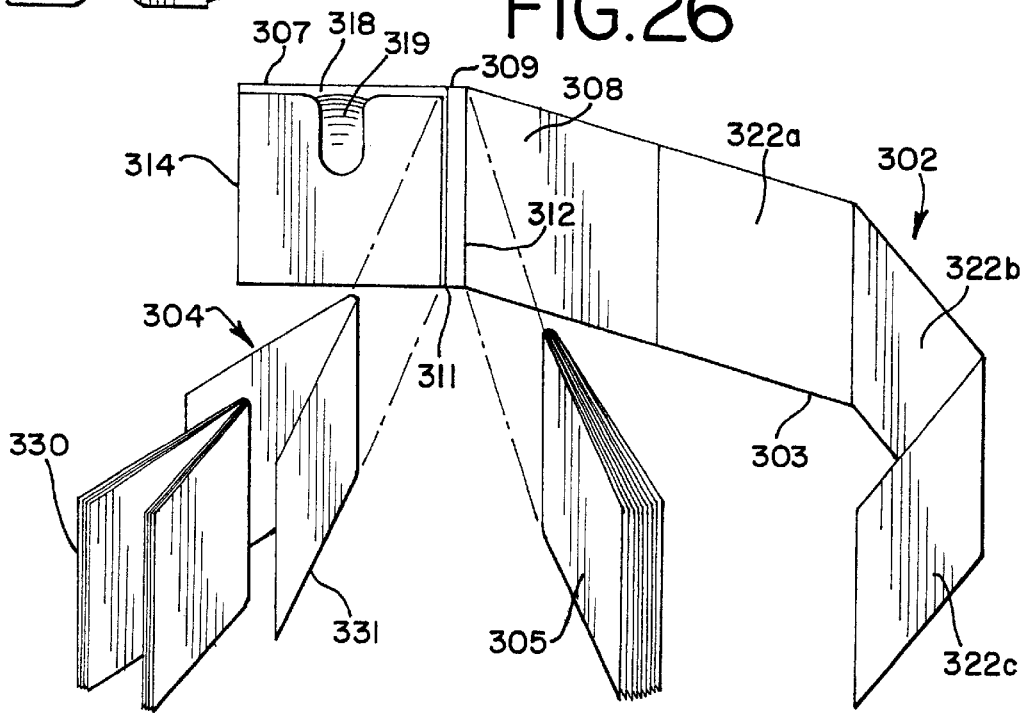

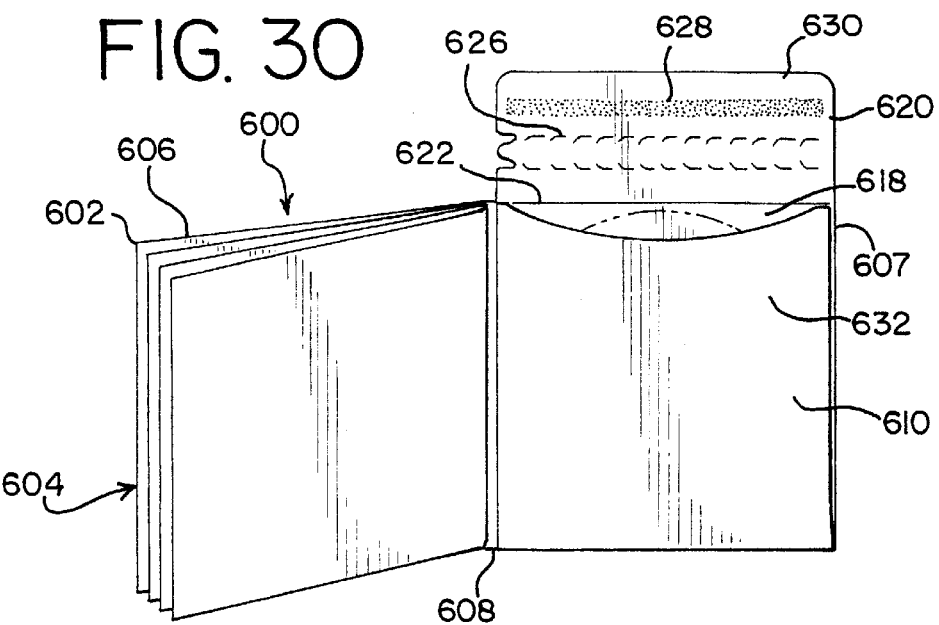
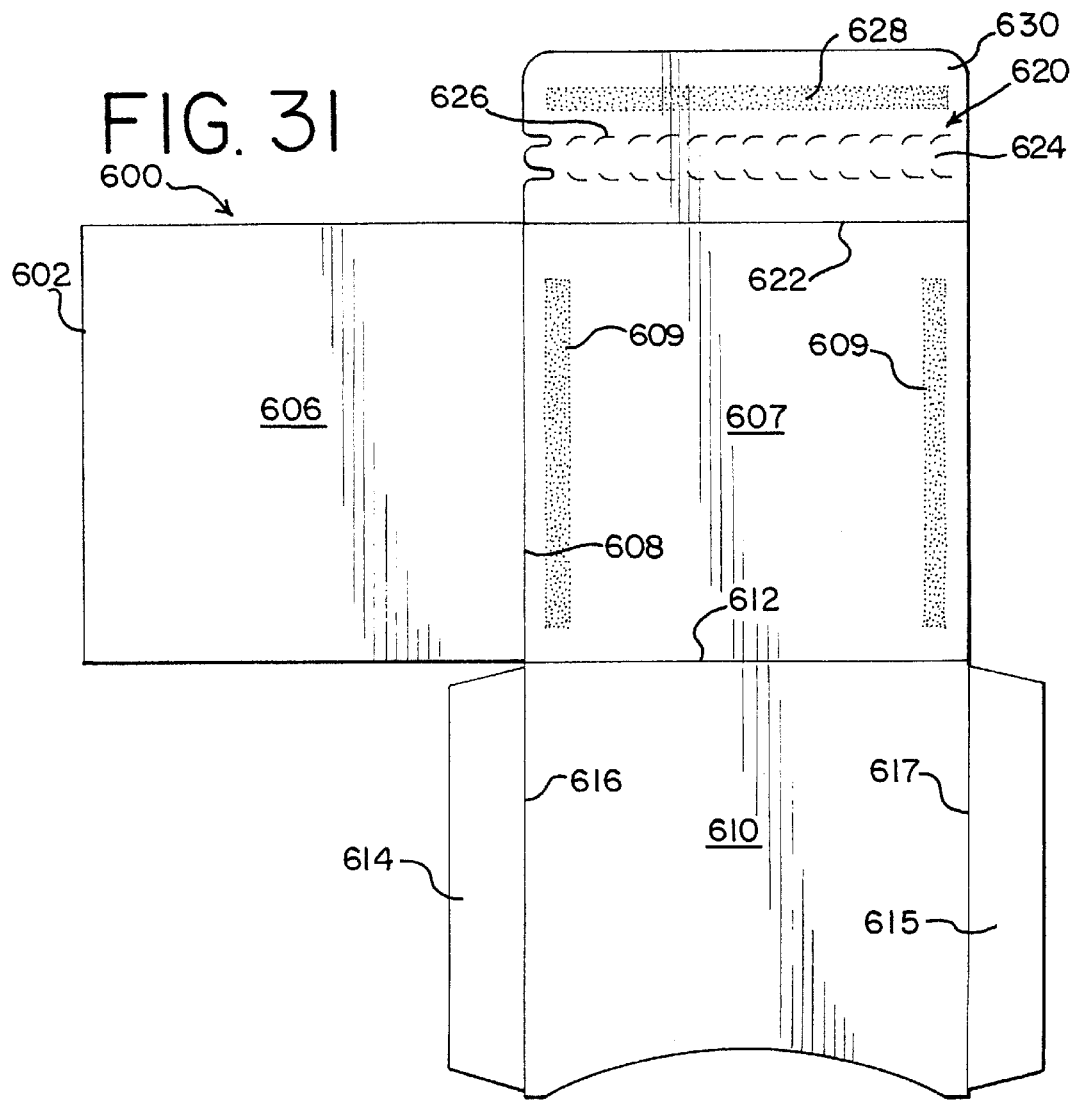

COMPACT DISC FOLDER BOOKLET

REFERENCE TO RELATED APPLICATION

This application is a continuation-in-part application of my prior U.S. patent application Ser. No. 08/821,337, filed Mar. 20, 1997 now U.S. Pat. No. 5,669,491 which is a continuation-in-part application of prior application Ser. No. 08/753,221, filed Nov. 21, 1996, now U.S. Pat. No. 5,669,491.

BACKGROUND OF THE INVENTION

The present invention relates generally to holders for compact discs and, more particularly, to compact discs holders having printed information that accompanies the compact disc.

Compact discs are used to store both digitally recorded music and computer programming information. The use of compact discs for computer programming has risen dramatically over the past few years and this use will likely increase because of the ability to store an enormous amount of data on a compact disc.

Audio compact discs, i.e., those containing prerecorded music, are typically stored in plastic containers known in the trade as "jewel boxes." Jewel boxes utilize front and rear plastic panels that are hinged together along adjacent edges. Although the jewel box is an effective storage device for compact discs, it is not recyclable and it is prone to breakage when sent through the mail.

Furthermore, jewel boxes are bulky compared to the thin compact disc stored therein. Manufacturing costs for the jewel box are also relatively high. The plastic jewel box is not easily printed on and any printed information accompanying the compact disc is enclosed in the box and positioned to show through the jewel box. As such, the manufacturing expense includes not only the plastic, molding and assembly costs for the jewel box but also the printing and paper costs for the inserts. The size of the jewel box limits the amount of printed matter that can accompany the compact disc. Small information booklets are either enclosed in the jewel box or held within a recess on the back of the jewel box. Removal of such booklets is awkward.

Software compact discs, i.e., those containing computer program information are known in the art as CD-ROMS. These types of compact discs also are typically stored in plastic jewel boxes. Often, a program manual accompanies the compact disc that is significantly thicker than the jewel box itself. This requires an additional package to enclose both the program manual and the jewel box containing the compact disc. Quite often, an end user will misplace either the manual or the jewel box.

There have been attempts to provide compact disc holders that overcome the disadvantages of the jewel box. These holders are formed from paper, such as those disclosed in U.S. Pat. No. 5,085,318. Although compact, this compact disc holder provides little room for printed information and any such information must be printed on the front and back covers only. U.S. Pat. No. 5,154,284 discloses a compact disc holder that uses one large, single sheet of paper that is folded accordion-style in a map-like fashion for storage within the CD holder. Opening and refolding the printed material is awkward and the number of folds increases the cost of the holder. The compact disc holders and packages of the prior art do not provide any compact disc carrier that also provides for the accompaniment of a thick manual. Additionally, the prior art is without a secure mailer for transmitting compact discs and program booklets in an inexpensive, secure and reliable manner.

The present invention is directed to a compact disc folder which overcomes the disadvantages of the aforementioned prior art.

Accordingly, it is a general object of the present invention to provide a compact disc folder in the form of a booklet having distinct cover and booklet portions and which holds a compact disc in an internal pocket as well as printed text or instructions.

Another object of the present invention is to provide a compact disc paged carrier for holding a compact disc and providing a suitable amount of printed information with the compact disc.

Yet another object of the present invention is to provide a compact disc folder in the form of a booklet having a relatively rigid cover portion that encloses a disc-receiving pocket and a text portion having multiple pages, the pages being integrated into the booklet and attached to the cover portion thereof.

Still another object of the present invention is to provide a compact disc folder for holding a compact disc and for holding a booklet accompanying the compact disc that is several times thicker than the compact disc.

A still further object of the present invention is to provide a compact disc folder in the form of a booklet, the booklet having a cover portion that has a disc-receiving pocket attached therewith in the interior of the booklet, the booklet having a text portion disposed in the interior of the booklet adjoining the disc-receiving pocket.

Yet another object of the present invention is to provide a compact disc folder booklet that encloses a compact disc and an accompanying booklet in a secure manner so that the folder booklet may also function as a mailer that encloses the compact disc in a disc-receiving pocket and an informational booklet of approximately the same or greater thickness as the compact disc, the manual and disc-receiving pocket adjoining each other when the folder is closed.

Still yet another object of the present invention is to provide a compact disc folder in the form of a booklet, the booklet having a distinct cover portion and at least one distinct paged portion enclosed by the cover, the cover portion including at least one disc-receiving pocket formed on an interior surface thereof and the booklet portion being attached to the interior of the cover portion, the cover portion including front and rear panels that define front and rear portions of the folder, one of the front and rear panels including at least one extension portion separated therefrom by at least one foldline, the extension portion being foldable upon the booklet portion.

SUMMARY OF THE INVENTION

In one aspect, the present invention is directed to a compact disc folder having a cover portion made from a paperboard blank having distinct front and rear panels interconnected by a vertical foldline. A pocket is formed on an interior surface of the front panel and when the folder is closed, overlies a multiple page booklet portion held between the front and rear panels. The pages of the booklet portion have centerlines that are aligned with the foldline of the folder.

In another aspect of the present invention, the folder includes a pocket panel attached to the front panel along a second foldline arranged generally perpendicular to the first foldline. The pocket panel is attached to the front panel by way of attachment flaps which are glued to the front panel along opposing side edges so that the pocket panel overlies the front panel. The flaps are of a length less than a corresponding length of the front panel side edges to which they are attached so that the pocket lies flat upon the front panel and doesn't bulge upwardly to cause interference with closing of the folder.

In still another aspect of the present invention, at least one of the flaps includes a notch formed between it and the front and rear panels of the cover portion. This notch permits the one flap to be folded upon the pocket panel along a line that is offset from the first foldline of the cover portion, thereby also ensuring that the folder as a whole will lie flat when in a closed position and also ensuring that the pocket does not interfere with the attachment of the booklet pages to the cover portion.

In another principal aspect of the present invention and as exemplified by a second embodiment thereof, the compact disc folder includes a cover portion having front and rear panels interconnected by an intervening spine panel and a first pocket panel that extends from the front panel and is folded upon the interior of the front panel to form a disc-receiving pocket. A second pocket panel extends from the rear panel and is folded upon the interior of the rear panel to form a side-load pocket that receives the rear cover of a thick booklet. The intervening spine panel permits the front and rear panels to be folded together so that they lie flat together without bulging and causing interference with the closing of the folder.

In still yet another principal aspect of the present invention and as exemplified by another embodiment, either the cover or rear portions of the folder may have a securement flap extending therefrom that folds over the open end of the folder and attaches to an opposing panel to form a secure enclosure. The securement flap may have lines of weakening formed therein to permit a user to open the folder.

In yet a further principal aspect of the present invention and as demonstrated by yet another embodiment of the invention, a dual compact disc folder, or carrier, is provided with first and second disc-receiving pockets formed on the interior portions of the front and rear cover portions. This folder embodiment is formed from a single blank that is folded once upon a first foldline to define the disc-receiving packets of the front and rear cover portions and secondly upon a second foldline that intersects the first foldline to thereby define the front and rear cover portions. In the area where the first and second foldlines meet, an opening is provided in the blank to eliminate the need for a gusset and to ensure that the folder as a whole will lay flat in a closed position.

In still another principal aspect of the present invention and as embodied within an additional embodiment, the compact disc folder cover portion may include one or more divider panels that extend from either of the cover portion front or rear panels, preferably the rear panel thereof, which are foldable upon one or two booklet portions attached to the interior of the cover portion.

These and other objects, features and advantages of the present invention will be clearly understood through consideration of the following detailed description.

BRIEF DESCRIPTION OF THE DRAWINGS

In the course of the following detailed description, reference will be frequently made to the accompanying drawings in which:

FIG. 1 is a perspective view of one embodiment of a compact disc folder constructed in accordance with the principles of the present invention;

FIG. 2 is the same view as FIG. 1, but showing the booklet portion thereof in an open position;

FIG. 4 is a plan view of a blank used in constructing the cover portion of the compact disc folder of FIG. 1; and, FIG. 5 is a perspective view of the blank of FIG. 4 in a partially-folded condition, illustrating the initial steps in constructing the cover portion thereof.

FIG. 6 is a perspective view of a second embodiment of a compact disc folder constructed in accordance with the principles of the present invention;

FIG. 7 is an end perspective view of the compact disc folder of FIG. 6 lying flat on its rear cover and illustrating the size of the booklet the folder may accommodate;

FIG. 10 is a perspective view of the blank of FIG. 9 in an assembled condition, illustrating how a relatively thick, paged booklet is inserted therein;

FIG. 11 is a plan view of a blank used in forming a cover portion for another embodiment of a compact disc folder constructed in accordance with the principles of the present invention;

FIG. 12 is an exploded perspective view of the folder blank of FIG. 11 showing the steps of assembly thereof;

FIG. 13 is a perspective view of the assembled compact disc folder, but in an open condition;

FIG. 14 is an end view of the compact disc folder of FIG. 13 in an closed condition;

FIG. 15 is a perspective view of a fourth embodiment of a compact disc holder constructed in accordance with the principles of the present invention;

FIG. 18 is an end view of the compact disc folder of FIG. 15;

FIG. 19 is an exploded perspective view of a fifth embodiment of a compact disc folder constructed in accordance with the principles of the present invention;

FIG. 20 is a plan view of a blank used to construct the cover portion of the compact disc folder of FIG. 19;

FIG. 21 is a perspective view of the compact disc folder of FIG. 19 in a closed condition, illustrating the securement flap attached to the front cover portion of the folder;

FIG. 22 is a top plan view of a sixth embodiment of a compact disc folder constructed in accordance with the principles of the present invention; and, FIG. 23 is a plan view of a blank used in forming the cover portion of the compact disc folder of FIG. 22;

FIG. 24 is a perspective view of a seventh embodiment of a compact disc folder constructed in accordance with the principles of the present invention;

FIG. 25 is a plan view of a blank used in forming the compact disc folder of FIG. 24;

FIG. 26 is an exploded perspective view of the compact disc folder of FIG. 24;

FIG. 30 is a partial perspective view of a tenth embodiment of a compact disc folder constructed in accordance with the principles of the present invention and having a sealing flap that seals the disc-receiving pocket; and, FIG. 31 is a plan view of a blank used to construct the folder of FIG. 30.

DETAILED DESCRIPTION OF THE INVENTION

Figure 3:
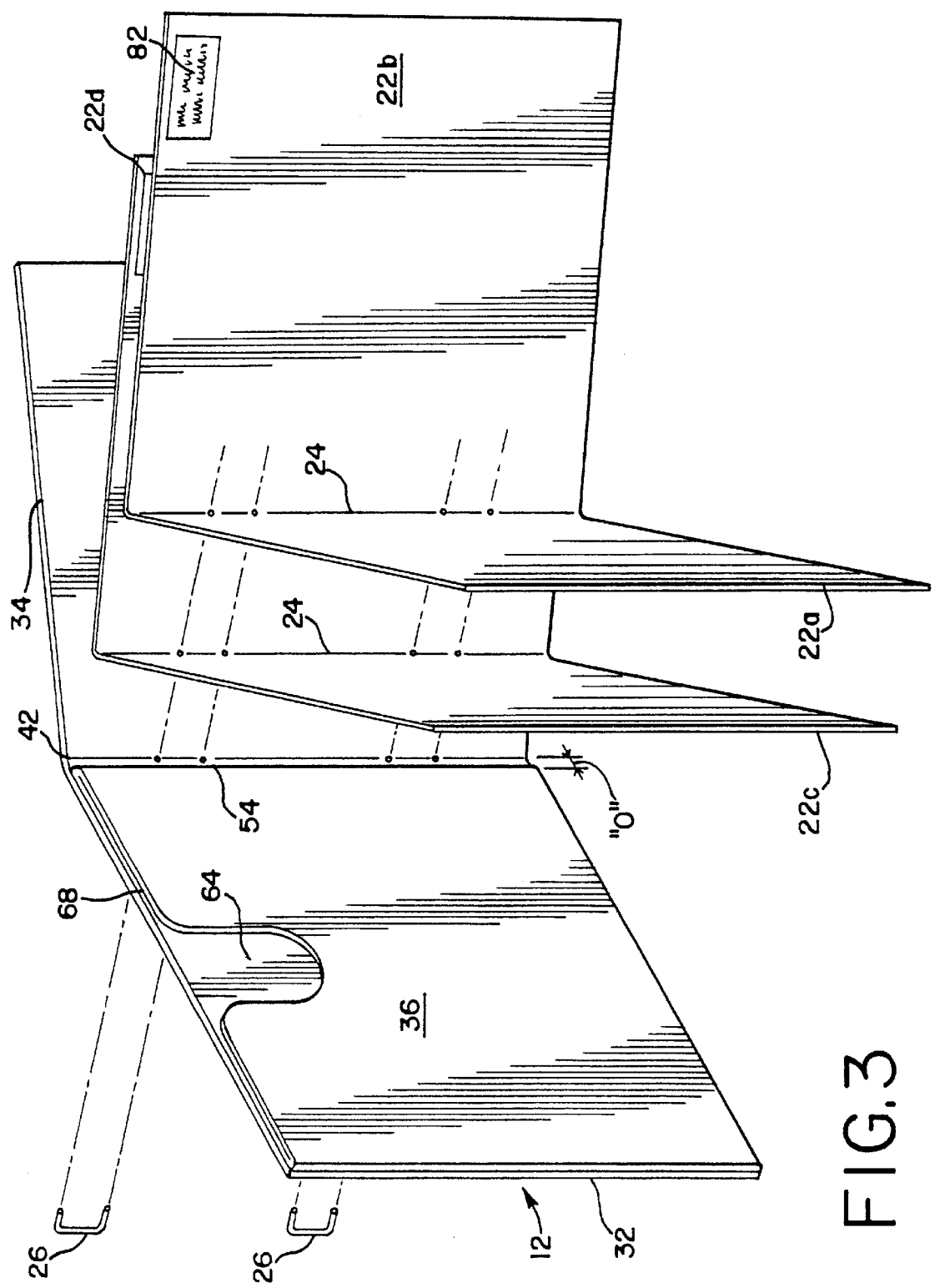
FIG. 3 is an exploded view of the compact disc folder of FIG. 1.

Referring to FIG. 1, a compact disc folder constructed in accordance with the principles of the present invention is illustrated generally at 10. The folder 10 takes the form of a booklet and includes an outer cover portion 12, an internal multiple page portion 14 and a compact disc-receiving pocket 16. The cover portion 12 may be easily formed from a single blank 20 of paperboard or another relatively rigid material. (FIG. 4.)

The page portion 14 of the folder 10 includes multiple pages 22a, 22b, 22c & 22d that are folded around a central, common foldline 24 thereof. The page portion 14 preferably includes multiple pages in groups of two pages, such as 22a & 22b and 22c & 22d. However, any number of pages may be used in constructing the page portion 14. The page portion 14 may be attached to the cover portion 12 of the folder by any suitable means, such as by staples 26, as illustrated in FIG. 3, or by stitching 28, as illustrated in FIGS. 1 & 2.

Turning now to the specific details of the cover portion 12, and with particular reference to FIGS. 4 & 5, it can be seen that the cover portion 12 is formed from a single blank 20. The cover portion 12 includes a front panel 32 defined thereon which serves as the cover of the folder 10, a rear panel 34 defined thereon which serves as the back of the folder 10 and an interior pocket panel 36 defined thereon which serves to form the disc-receiving pocket 16 that holds the compact disc 40, shown in phantom, therein.

The front panel 32 and the rear panel 34 are interconnected to each other along common opposing edges that meet at an intervening foldline 42 which has a vertical orientation when the folder 10 is in an upright position such as illustrated in FIGS. 1–3. The interior panel 36 is interconnected to the front panel 32 along common opposing edges that meet at an intervening second foldline 44 that assumes a horizontal orientation when the folder 10 is in its upright position. The second foldline 44, as indicated in the Figures, is angularly offset from the foldline 42 and is preferably generally perpendicular thereto. The front panel 32 has two pairs of side edges 45a–45d that define its dimensions and extent. Two of these side edges 45a, 45b are located along the top and bottom edges of the front panel 32, while the remaining two side edges 45c, 45d define the sides of the front panel 32 and interconnect the top and bottom side edges 45a, 45b together.

The interior panel 36 that forms the pocket 16 in cooperation with the front panel 32 of the folder 10 includes two attachment panels, or flaps 46, 48, that are interconnected to the interior panel 36 along two opposing side edges 49a, 49b thereof. The flaps 46, 48 are separated from the interior panel 36 by intervening third and fourth foldlines 50, 52 that extend generally parallel to the foldline 42.

In an important aspect of the present invention, the third foldline 50 is slightly offset from the foldline 42 that separates the front and rear panels 32, 34. This offset is indicated at "O" in FIG. 4. The third foldline 50 defines the right side edge 54 of the interior panel 36 and of the disc-receiving pocket 16. The offset keeps the right side edge 54 of the pocket away from the center of the folder 10 and away from the foldline 42 to permit alignment of the page centerlines 24 with the foldline 42. This offset also permits the folder to lay substantially flat when in a closed, folded position, wherein the front panel is folded upon the rear panel 34 with the pages 22a–22d held therebetween.

In order to facilitate assembly of the pocket 16, at least one flap 50, and preferably both flaps 50, 52 have lengths that are less than the lengths of the side edges 49a, 49b of the interior panel 36. This dimensional relationship is preferably accomplished for the one flap 50 by way of a notch 54 interposed between the end 55 of the flap 50 and the bottom side edge 45b of the front panel 32 and the bottom side edge 80 of the rear panel 34. The notch 54 can be seen to terminate past the first foldline 42 and adjacent the front panel 32 along the bottom side edge 45b thereof. The notch further terminates at the third foldline 50 to ensure that the offset "O" is not compromised.

Adhesive is used to attach the flaps 50, 52 to the inner surface 60 of the front panel 36. The adhesive is preferably a permanent adhesive and is applied to either the front panel inner surface 60 in strips or beads 62, as illustrated, or it may be applied to the flaps 50, 52 themselves. The interior panel may further include a cutout 64 extending from one side edge 66 thereof which lies adjacent the opening 68 of the pocket 16. This cutout 64 extends inwardly a sufficient extent top permit a user to reliably grab hold of the compact disc 40 when it is retained within the pocket 16.

In assembling the folders 10 of the present invention, the blank 20 may be die-cut from a sheet of paperboard, and the flaps 50, 52 are folded about their respective foldlines 49a, 49b as illustrated in FIG. 5. The interior panel 36 is thereupon folded onto the front panel 32 around foldline 44. The page portions 14 are then attached to the cover portion 12 by stitching (saddle stitching or otherwise), stapling or any other suitable means, such as gluing along the foldline 42. This construction permits the pages to be numbered with individual serial numbers in designated areas 20 for promotional, identification or ordering purposes during the printing of the pages prior to assembly into the cover portion 12.

FIGS. 6–11 illustrate a second embodiment of a compact disc folder 70 constructed in accordance with the principles of the present invention. The folder 70 generally differs from the first embodiment 10 shown in FIGS. 1–5 in that it contains a relatively "thick" booklet 72 that is held within a booklet-receiving pocket 97 of the folder 70 so that the booklet 72 lies adjacent to the compact disc 40 held within a disc-receiving pocket 74, when the folder 70 is closed. Each of these pockets 74, 97 are interior pockets, that is, they are accessible when the folder 70 is opened.

Figure 8:
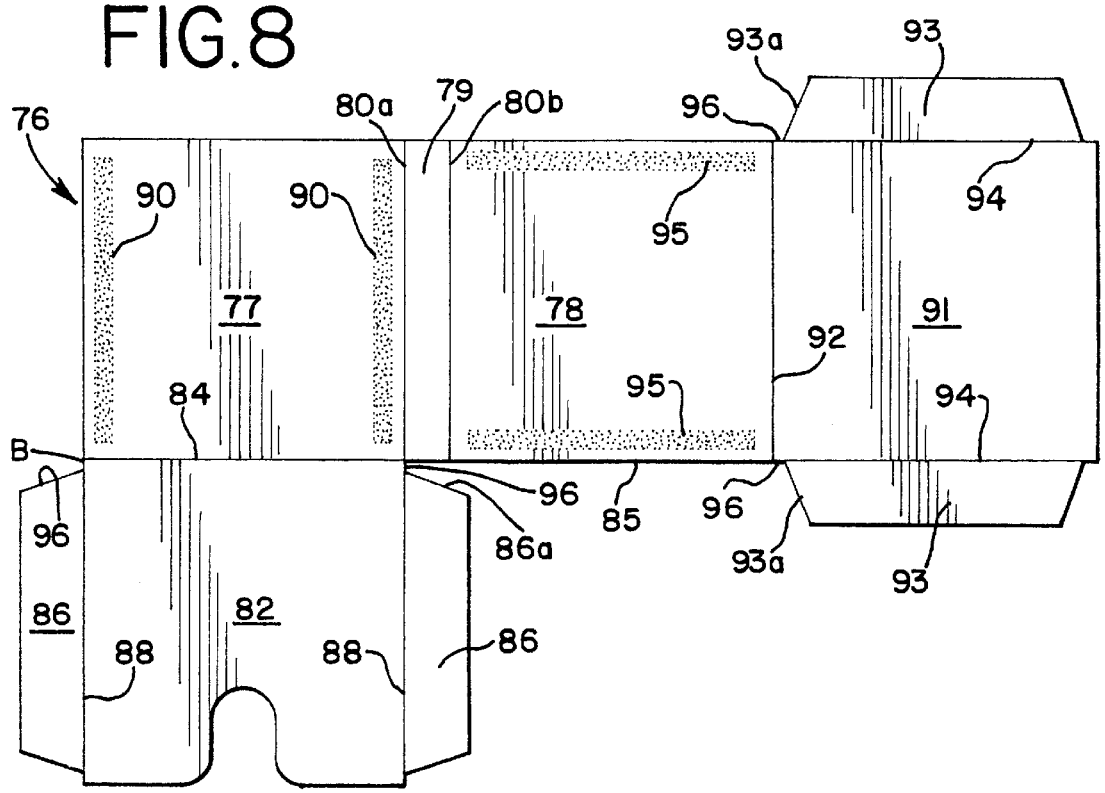
FIG. 8 is a plan view of a blank used in constructing the cover portion of the compact disc folder of FIG. 6.

As illustrated best in FIG. 8, the folder 70 includes a cover portion 75 that is formed from a single blank 76 of suitable material, such as paperboard. (FIG. 11.) The blank 76 includes a front cover panel 77 and a rear cover panel 78. These two cover panel 77, 78 are interconnected by an intervening spine panel 79 having a width W that is approximately equal to or slightly greater than the thickness T of the booklet 72. This spine panel 79 is defined by a pair of first foldlines 80a, 80b that extend parallel to each other and define the spine 73 of the booklet 72.

Figure 9:
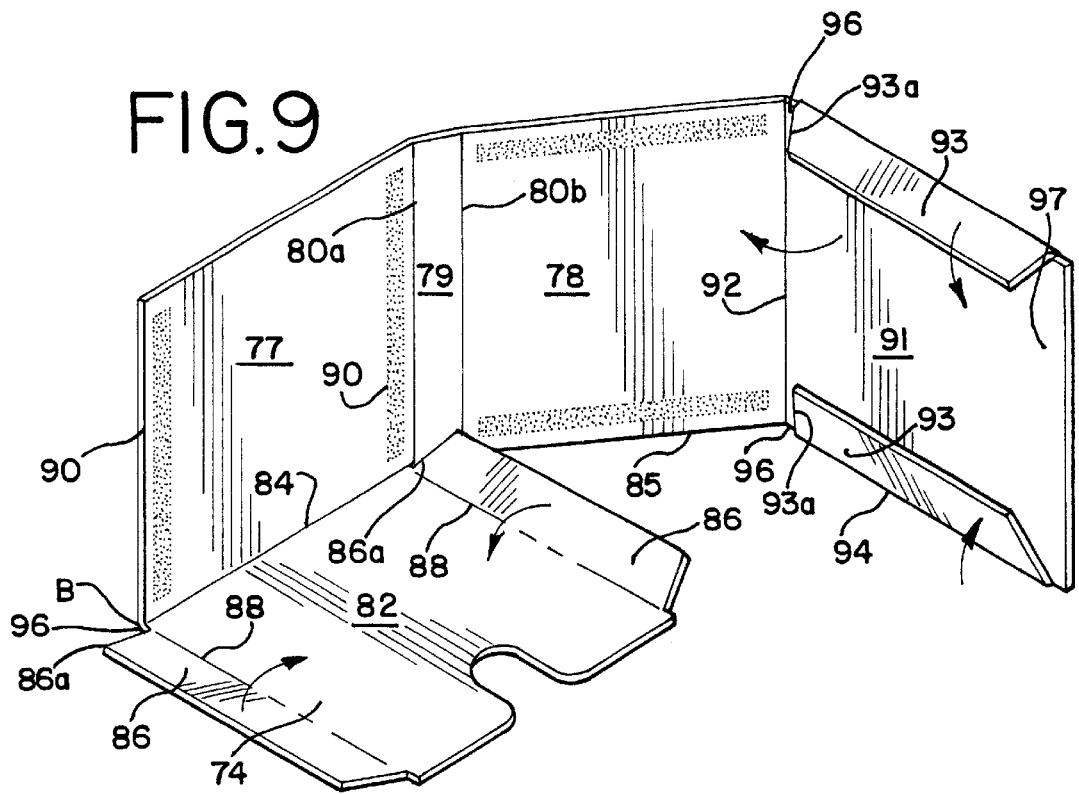
FIG. 9 is a perspective view of the blank of FIG. 8, in a partially-folded condition, illustrating the initial steps in constructing the cover portion compact disc folder of FIG. 6.
Figure 16:
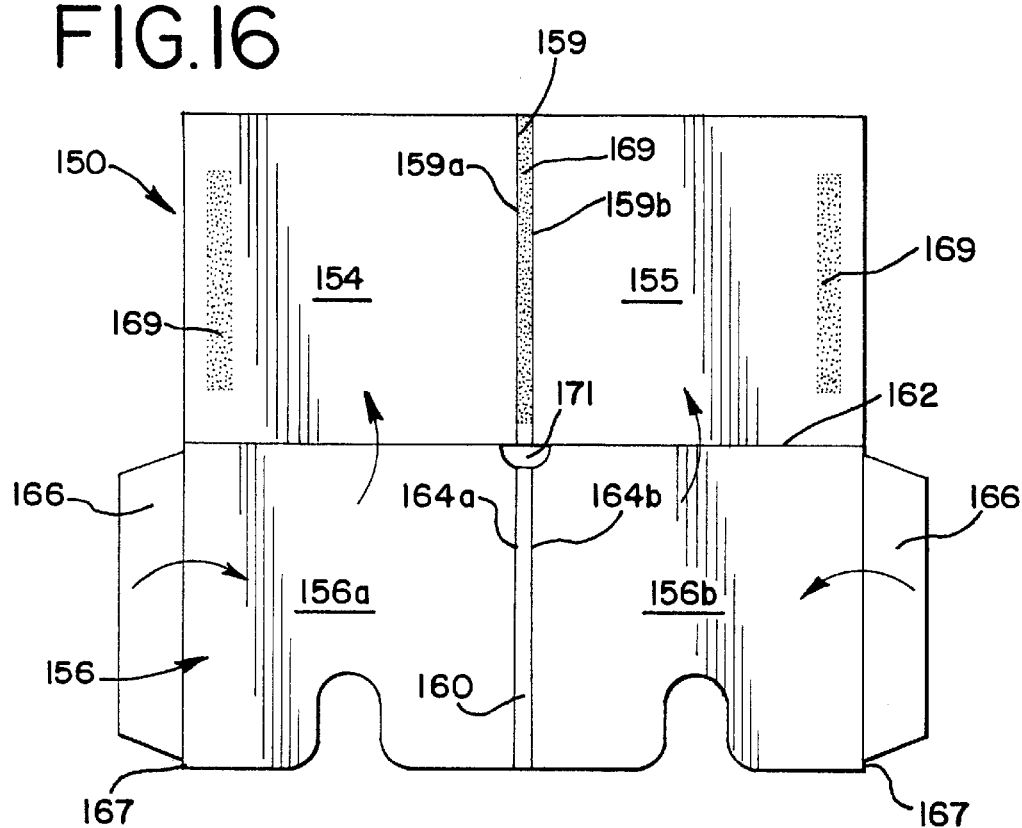
FIG. 16 is a plan view of a blank used to form the cover portion of the compact disc folder of FIG. 15.

The first pocket 74 that accommodates one compact disc 40 is formed by a first interior pocket panel 82 that is attached to the front cover panel 77 and separated therefrom by a second foldline 84. This foldline 84, as illustrated in FIG. 8, may lie coincident with the bottom edge 85 of the rear cover panel 78 and the baseline B of the folder 70. The second foldline 84 also runs perpendicular to the first foldlines 80a, 80b and intersects at least one 80a of them. The pocket panel 82 may include attachment flaps 86 formed therewith which are separated from the pocket panel 82 by foldlines 88. The flaps 86 are folded upon the pocket panel 82 as shown in FIG. 9 and are attached to the interior surface of the front cover panel 77 by a suitable means such as self-adhesive tape or hot-melt glue strips 90 or other type of adhesive.

The second pocket 97 of the folder 70 does not receive a compact disc, but rather receives the booklet 72. The second pocket 97 is formed from a second interior pocket panel 91 that is attached to the rear cover panel 78 and separated therefrom by a third foldline 92. This foldline 92 extends generally parallel to the first foldlines 80a, 80b that define the spine panel 79. One or more attachment flaps 93 are defined by respective foldlines 94 in the second pocket panel 91 and permit the second pocket panel to be attached to the rear cover panel 78. An adhesive means such as glue strips 95 may be deposited either on the interior surface of the rear cover panel 78 as illustrated or may be applied to the flaps 93 themselves to complete the forming of the second pocket 97 for the folder 70.

In order to facilitate assembly of the two interior pockets 74, 97 at least one of the flaps 86, 93 of the two pocket panels 82, 19 proximate to the baseline B (represented by the dark horizontal line in FIG. 8) has a length that is less than the respective foldlines 88, 94 that separate the flaps from their associated pocket panels 82, 91. This dimensional relationship is preferably accomplished by way of interposing a notch 96 between the one flap 86 and the baseline B or by removing the beginning edges 86a, 93a of the flaps 86, 93 from the baseline B. The spacing defined by the notch 96 ensures that the flaps 86, 93 do not interfere with the folding of the pocket panels 82, 91 during assembly of the folder blank 76 and further ensures that the pocket panels 82, 91 will generally lie flat when assembled.

In assembling this embodiment, the blank 76 may be die cut from a sheet of paperboard and the various panels 77, 78, 79, 82, 91 and their associated flaps 86, 93 are defined by forming the various foldlines 80, 88 & 92. The first pocket panel 82 may have its flaps 86 folded upon itself and the pocket panel 82 folded about foldline 84 onto the interior surface of the front cover panel 77 and into contact with the adhesive 90 to define the disc-receiving pocket 74. The second pocket panel flaps 93 are then folded and the pocket panel 91 folded upon and adhered to the interior surface of the rear cover panel 78 at adhesive areas 95 to form the booklet-receiving pocket 97.

The booklet 72 then is inserted into the pocket 96 defined by the rear pocket panel 91. The booklet 72 itself preferably includes a relatively rigid cover 87 with distinct front and rear cover flaps 88a, 88b. The rear cover flap 74b is inserted into the rear pocket 97 formed between the second pocket panel 91 and the rear cover panel 78. If necessary, either the rear cover panel 78 or the booklet rear cover flap 74b may have a pressure-sensitive adhesive deposited thereon to assist the rear pocket to retain the booklet 72 in place. A compact disc 40 is inserted into the front panel pocket and the two cover panels 77, 78 are then folded onto each other to arrive at a desired square or rectangular booklet shape depicted in FIG. 7. When closed, the spine panel 79 forms a spine or backbone of the finished folder 70.

FIGS. 11–14 illustrate a third embodiment of a compact disc folder 100 constructed in accordance of the principles of the present invention. The folder 100, as best shown in FIG. 13 accommodates a compact disc 40 and a thick booklet 72 which may contain programming information in instances where the compact disc 40 is a CD-ROM or artist biographical information in instances when the compact disc 40 is a music compact disc. This folder 100 may also contain a smaller booklet portion 14 to provide additional printed information. In forming the folder 100, a blank 102 is die cut to form a multiple panel cover portion 104 of the folder 100. (FIG. 11.) The cover portion 104 has distinct front and rear panels 105, 106 that are interconnected by a first intervening spine panel 107 which is set apart from the front and rear panels 105, 106 by foldlines 109a, 109b. These foldlines 109a, 109b are oriented parallel to the baseline B of the folder.

A disc-receiving pocket 110 is formed in the folder 100 between the front cover panel 105 and a first interior panel 112 that lies adjacent to the front cover panel 105. The front cover panel 105 is separated by a second foldline 113 from the interior panel 112 and a pair of attachment flaps 115a, 115b interconnected to the thereto along respective foldlines 117a, 117b that are also angularly offset from the baseline B. As shown in FIG. 12, these flaps 115a, 115b are folded upon the first interior panel 112 and then adhered to the interior surface of the front cover panel 105 by way a suitable adhesive means 118 applied to either the front cover panel 105 or the interior panel flaps 115a, 115b.

A second pocket 120 of the folder is formed to receive the rear cover flap 88b of the booklet 72. This second pocket 120 is formed from two adjoining interior second pocket panels 122a, 122b which are interconnected to the rear cover panel 106 by a second intervening spine panel 124. One of the two second pocket panels 122b may include one or more attachment flaps 126a, 126b disposed thereon to provide a means for attaching the two panels 122a, 122b together using adhesive 127 or the like.

The booklet rear flap 88b is held within the booklet-receiving pocket 120 in the manner above described for the second embodiment 70. An additional, multiple-page booklet 14 may be supported on the cover portion 104 along one of the foldlines 109a that define the spine panel 107 in a suitable manner such as by saddle stitching or by the use of staples 26. The two spine panels 107, 124 permit the second pocket panel 122 and the front cover panel 105 to be folded over the rear cover panel 106 and each other in the manner shown in FIG. 14. In this regard, it is desirable that two spine panels 107, 124 have about the same widths $W_1$, $W_2$ so the folder 100 will assume a flat booklet shape as illustrated in FIG. 14. In order to compensate for the additional thickness of the folder 100 caused primarily by the additional booklet 14, the width $W_1$ of the first spine panel 107 may be slightly greater than the width $W_2$ of the second spine panel 124.

As with the folders previously described, notches 130 may be formed between the attachment flaps 115a, 115b and the nearest foldline 113 that separates the flaps 115a, 115b from an adjoining cover panel 105. The notches 130 may be die cut separately or formed by spacing the beginning edges 131 of the flaps 115a, 115b apart from their associated foldline 113. Similar notches are in effect formed on the attachment flaps 126a, 126b of the second pocket panels 122a, 122b. The use and location of these notches 130 permits the two pockets 110, 120 and the booklets 14, 72 to lie substantially flat when the folder 100 is in a closed position as shown in FIG. 14.

FIGS. 15–18 illustrate a fourth embodiment of a compact disc folder 150 constructed in accordance with the principles of the present invention. This folder embodiment 150 includes a cover portion 151 that accommodates two compact discs 40, 40' in respective first and second disc-receiving pockets 152, 153 that are cooperatively defined between respective front and rear panels 154, 155 and an interior pocket panel 156. As shown in the blank 158 of FIG. 16, the front and rear panel 154, 155 are preferably interconnected together by an intervening panel 159 that is defined by two parallel foldlines 159a, 159b.

A single interior pocket panel 156 having distinct first and second portions 156a, 156b and a central portion 160 is attached to the front and rear panels 154, 155 along a second foldline 162 that forms a baseline B of the completed folder 150. This second foldline 162 extends perpendicularly to the foldlines 159a, 159b that define the spine panel 158 and intersect therewith. The two parallel foldlines 159a, 159b are preferably coincident with a like pair of foldlines 164a, 164b that define the central portion 160 of the interior pocket panel 156. The interior pocket panel 156 may include one or more flaps 166 disposed at the outer edges 167 thereof in order to attach the pocket panel 156 to the front and rear cover panels 154, 155. Adhesive 169 is deposited on appropriate surfaces of the folder 150, shown in FIG. 16 as along the outer edges 170 of the front and rear panels 154, 155 and preferably along the intervening portion 159. It will be understood that the adhesive may also be placed on the flaps 166 or pocket panel 156 and the same results achieved.

In assembly of the folder 150, the blank 158 is die-cut and the flaps 166 folded onto the pocket panel 156 and the various foldlines are formed. The pocket panel 156 is folded around the second foldline 162 onto the front and rear panels 154, 155 so that the adhesive 169 holds them together. In order to ensure that the folder will lie flat when in a closed position, such as shown in FIG. 18, and in order to prevent the formation of an unsightly bulge, or gusset, at the intersection of the foldlines 159a, 159b and 162, the interior pocket panel is provided with an opening, illustrated as a notch 171. This opening 171 is positioned adjacent the base foldline 162 and extends into the first and second portions 156a, 156b of the pocket panel 156. This notch 171 prevents the interior panel 156 from buckling and forming an inadvertent gusset that would tend to cause a bulge at the middle of the cover panels 154, 155. This bulge would prevent the folder 150 from lying flat while closed.

Figure 17:
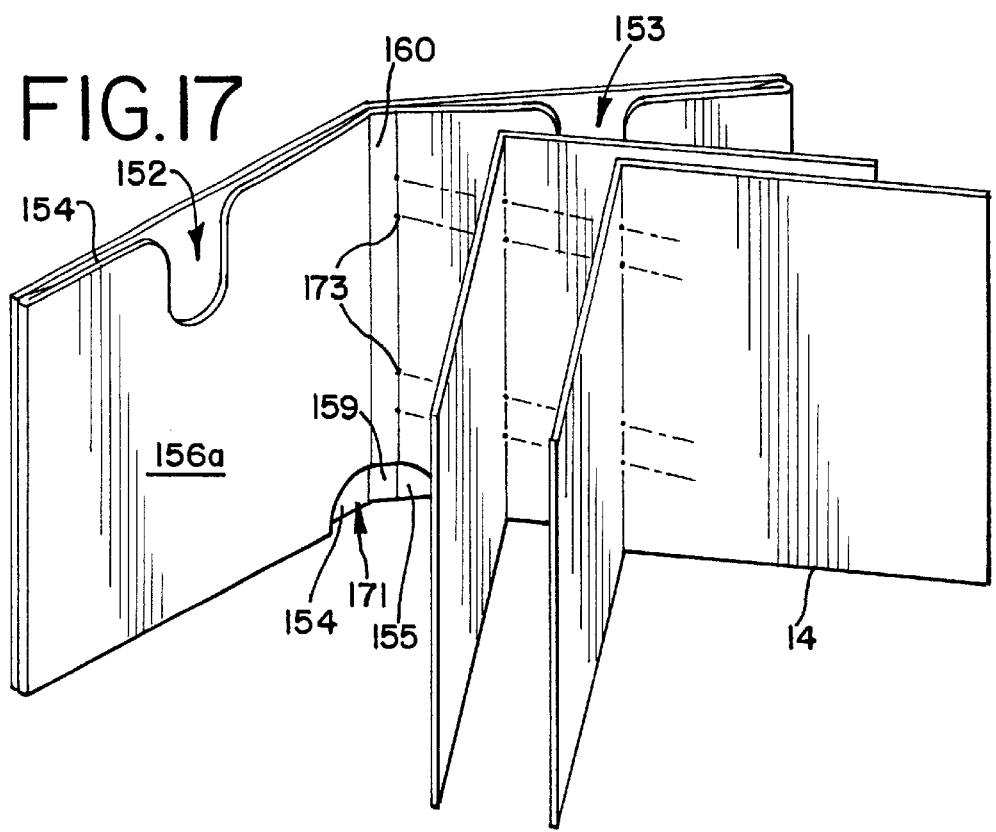
FIG. 17 is an exploded view of the compact disc folder of FIG. 15.
Figure 27:
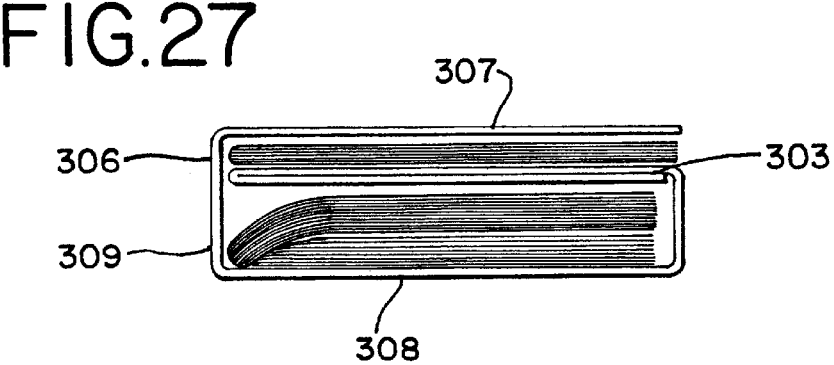
FIG. 27 is an end view of the compact disc folder.

This folder 150 also contains a multiple page booklet 14. The booklet is supported on the cover portion 151 along one of the central foldlines 159a, 159b in a conventional manner such as by adhesive, staples or saddle stitching 173 as illustrated in FIG. 17. The central panels 159, 160 of the cover portion 151 are preferably wide enough to accommodate the booklet 14 in a manner so that the folder 150 will lie substantially flat when closed. (FIG. 18)

FIGS. 19–21 illustrate yet a fifth embodiment of a compact disc paged carrier 200 that is a variant of the fourth embodiment 150 and that is particularly suitable for use as a mailer. The carrier 200 also contains two compact discs 40, 40' in first and second disc-receiving pockets 202, 203 aligned with the front and rear panels 205, 206 of the cover portion 208 of the carrier 200. The pockets 202, 203 are formed by respective interior pocket panels 210, 211 that are interconnected to the front and rear cover panels 205, 206 and separated therefrom by a foldline 212. The interior pocket panels 210, 211 preferably include attachment flaps 214, 215 that are folded upon the interior panels 210, 211 and serve to attach the panels 210, 211 to the front and rear cover panels 205, 206 by adhesive deposits 216.

The folder front and rear cover panels 205, 206 are interconnected with each other by an intervening panel 220 defined by two foldlines 222a, 222b. The folder 200 includes an interior booklet 14 that is secured to the cover portion of the folder 200 by adhesive, staples or saddle-stitching 224 as shown. The foldlines 222a, 222b extend at an angle to the foldline 212 and preferably perpendicular thereto. In order to permit the folder 200 to lay substantially flat while in a closed position when the front cover panel 205 is folded upon the inner booklet 14 and the rear cover panel 206, the opposing inner edges 225, 226 of the interior panels 210, 211 are preferably offset at $O_1$, $O_2$ from the intervening panel 220 and the foldlines 222a, 222b that the booklet 14 is aligned with.

In order that the folder 200 may serve as a mailer, the folder 200 may include a sealing flap 228 as illustrated in FIG. 21, that is attached to one 206 panel of the front and rear cover panels 205, 206. This sealing flap 228 is located opposite the spine or backbone panel 220 of the folder 220 and extends over the open end 230 of the folder 200. An adhesive 230 may be used to affix the sealing flap 228 to the front cover panel 205. If desired, the sealing flap 228 may include lines of weakening, such as perforations 232, that define a tear strip 233 by which a user may gain access to the contents of the folder 200. The offset spacings $O_1$, $O_2$ between the two interior pocket panels 210, 211 may be considered as constituting a collective notch 240 that reduces the thickness of the folder 200 along the central intervening panel 220 and that prevents the formation of an unwanted gusset that would prevent the folder 200 from lying flat when closed and would prevent the proper sealing of it with the sealing flap 228.

FIGS. 22 & 23 depict a sixth embodiment 250 of a dual compact disc paged carrier constructed in accordance with the principles of the present invention. This dual disc folder, or carrier 250, accommodates two compact discs 40, 40' in two disc-receiving pockets 251, 252 that lie between the front cover panel 254 and a single interior pocket panel 255. This interior panel 255 is interconnected to the front cover panel 254 and is separated therefrom by a foldline 258. The front cover panel 254 is likewise interconnected to a rear cover panel 256 and separated therefrom by a second foldline 259 that runs generally parallel to the first foldline 258. Adhesive deposits 260 are used to hold the interior pocket panel 255 to the first cover panel 254 and are preferably aligned with one or more attachment flaps 262 to form the disc-receiving pockets 251, 252.

A sealing flap 270 may be included as part of the rear cover panel 256 and disposed along one edge thereof. The flap 270 may include an adhesive deposit 272 for securement of it to the front cover panel 254. A multiple page booklet portion 14 is held between the two cover panels 254, 256 along the central foldline 259. The inner edge 275 of the pocket panel 255 is offset by a distance $O_3$ from the foldline 259 as in the folder 200 of the embodiment previously described. This offset $O_3$ permits the compact discs 40, 40' to be easily inserted into or grasped for removal from the two pockets 251, 252. The adhesive 260 may be arranged on either of the panels 254, 255 in any desired pattern to secure the attachment of the two panels together.

FIGS. 24–27 illustrate a seventh embodiment 300 of a paged compact disc folder constructed in accordance with the principles of the present invention. This folder 300 is similar to the embodiment of FIGS. 11–14, but includes one or more additional panels that cooperatively define a section 302 that extends from either the front or rear cover portion thereof and which may be used as a divider 303 between the two paged booklets 304, 305 of the folder 300.

The folder 300 may be die cut from a suitable stock and, as shown in FIG. 25, includes a cover member 306 having a front cover panel 307, a rear cover panel 308 and an intervening cover panel or spine 309 that interconnects the two cover panels 307, 308 together. The intervening spine panel 309 is defined in the embodiment illustrated by a pair of foldlines 311, 312. An interior pocket panel 314 is attached to the front cover panel 307 and is separated therefrom by way of a foldline 316 that is offset from the spine panel foldlines 311 & 312. The interior pocket panel 314 includes two flaps 317 that are folded upon the pocket panel 314 and affixed to the front cover panel 307 by conventional means, such as gluing, to define a receptacle or pocket 318 that receives a compact disc 319 therein.

In order to accommodate printed material that accompanies the compact disc 319, such as an operation or instruction manual, the folder 300 may include two booklets 304, 305 of different size. As seen in the embodiment illustrated, the first such booklet 304 is relatively thin compared to the second booklet 305 which is thicker. The first booklet 304 is disposed within the folder 300 along the first foldline 311 proximate to the front cover panel 307 while the second booklet is disposed along the second foldline 312 proximate to rear cover panel 308. The booklets 304, 305 may be affixed to the folder 300 by way of edge gluing, stapling or stitching, such as saddle stitching.

In order to provide a divider 303 for the folder 300 that separates the two booklets 304, 305 from each other, the rear cover panel 308 may have one or more additional inner cover panels 322 attached thereto and extending therefrom. These inner cover panels 322 are illustrated best in FIG. 25 as three such panels 322a, 322b and 322c that extend out from the rear cover panel 307 and are separated by additional foldlines 324, 325 and 326. It will be understood that the inner cover panels 322a-c may extend from the front cover panel 307 and the pocket panel 314 may extend from the rear cover panel 308.

This divider 303 may be utilized as a base upon which to print additional information, such as advertising of related software products or for "quick-start" operation of installation instructions for the software found on the compact disc 319. Thus, the presence of the divider 303 permits the booklets 304, 305 to be reduced in size when the quick start information is present. Additionally, the divider 300 assists in separating the two booklets 304, 305 so that when the folder 300 is opened, the user is directed to the first booklet 304. Thus, the two booklets 304, 305 will not interfere with each other when the folder 300 is opened.

As shown best in FIG. 26, the first booklet 304 (as well as the second booklet 305) may include a interior, multiple-page portion 330 that is enclosed by lightweight cover panel 331. Such a booklet may be saddle-stitched together as well as to the folder 300. The second booklet 305 may include a thicker, multiple-paged interior portion 331 that is also stitched, glued or otherwise affixed to the folder cover member 306 along the second foldline 312. Preferably, the width of the spine panel 309 is equal to or slightly greater than the thickness of the two booklets 304 and 305 so that when the folder 300 is laid on one of front or rear cover panels, the folder 300 lies akin to the manner illustrated in FIG. 27.

Figure 28:
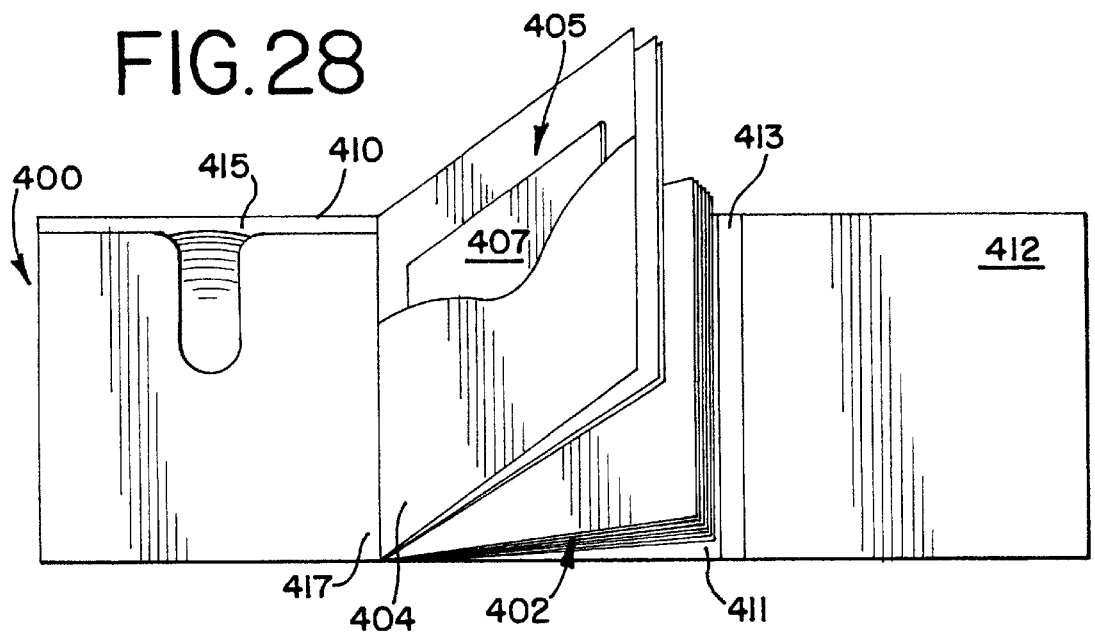
FIG. 28 is a partial perspective view of another embodiment of a compact disc folder constructed in accordance with the principles of the present invention.

FIG. 28 illustrates another embodiment of a compact disc folder 400 constructed in accordance with the principles of the present invention in which the interior booklet 402 has a cover portion 404 formed from a durable material, such as a paperboard stock. The folder 400 includes a front cover panel 410, a rear cover panel 411 and an extension panel 412 separated therefrom by an outer spine panel 413 defined by a pair of foldlines. A disc-receiving pocket 415 is formed with the front cover panel 410 and the cover panels 410, 411 support the interior booklet 402 along a foldline 417 that lies intermediate the two cover panels 410. The cover portion 404 may include, as illustrated, a pocket 405 formed therewith in a manner similar to which the pocket 318 of the folder 300 is formed. This pocket 405 may accommodate a printed start-up or quick installation guide 407 and thereby negate the need for a divider 408 having more than one divider panel.

Figure 29:
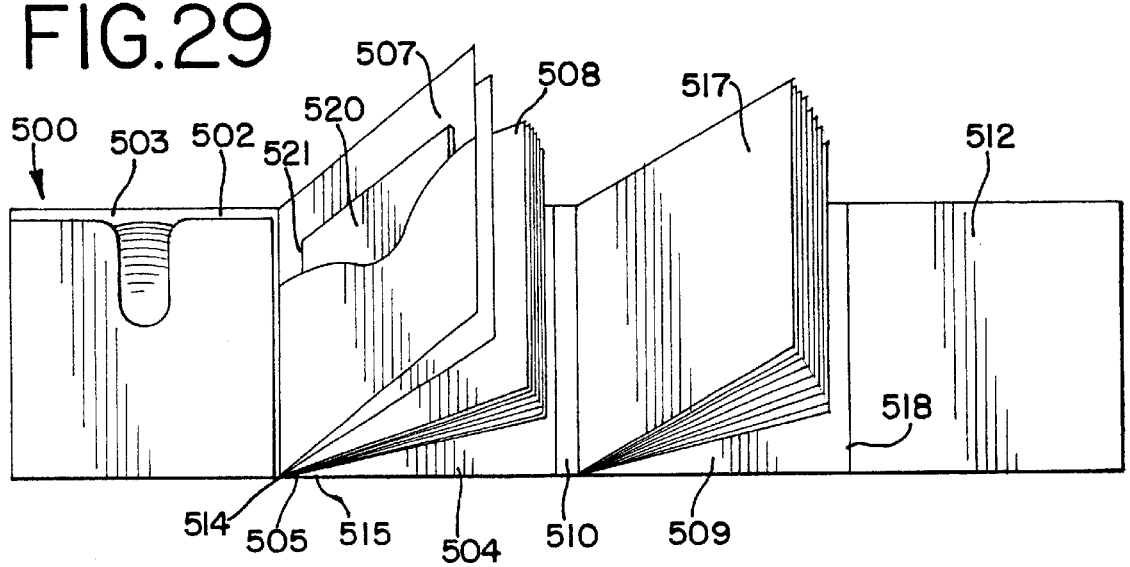
FIG. 29 is a partial perspective view of a ninth embodiment of a compact disc folder constructed in accordance with the principles of the present invention.

FIG. 29 illustrates still another embodiment of a compact disc folder 500 of the present invention in which the cover portion 502 has adjacent front and rear cover panels 503, 504 separated by an intervening spine panel 505 that accommodates two booklets 507, 508 between the front and rear cover panels 503, 504. The rear cover panel 504 includes divider panel 512 extends outwardly and which is interconnected to the intermediate panel 509. The two booklets 507, 508 are aligned with and attached to the cover portion 502 along two vertical foldlines 514, 515. A third booklet 517 may be attached to the cover portion 502 along the second spine panel 510 and the divider panel 512 may be folded along its foldline 518 to separate the third booklet 517 from the other two booklets 507, 508. Quick start instructions may be included with this folder 500 in the form of a folded inset 520 that is applied to a pocket panel 521 of the first booklet 507.

Turning to FIGS. 30 & 31, a tenth embodiment of a paged compact disc carrier is indicated generally at 600. The carrier 600 includes a cover portion 602 and an internal booklet portion 604. The cover portion 602 may be considered as having two distinct first and second panels 606, 607 that are interconnected along a first foldline 608. An interior panel 610 is interconnected to the second panel 607 and separated therefrom by a second foldline 612 that extends at an angle to, and preferably perpendicular to, the first foldline 608. The interior panel 610 may include one or more attachment flaps 614, 615 that are interconnected to the interior panel 610 along respective third and fourth foldlines 616, 617 and which may be attached to the second panel 607 by suitable means, such as an adhesive strip 609.

The interior panel 610 is folded upon one of the first and second panels 606, 607, shown as the second cover panel 607, to define a compact disc-receiving pocket 618 of the folder 600. In order to securely seal the disc in the disc-receiving pocket 618, the folder 600 is provided with an additional interior, or seal, panel 620 that is interconnected to the first panel 606 at a fifth foldline 622. This seal panel 620 is disposed opposite the interior panel 610 due to the parallel relationship of the second and fifth foldlines 612 and 622 and includes a tear strip 624 formed therein by way of a series of perforations 626 or the like. An adhesive strip 628 may be disposed on either the interior surface 630 of the seal panel 620 on the exterior surface 632 of the pocket panel 610. Although illustrated as being interconnected to the rear panel 607 of the folder cover portion 602, it will be understood that the pocket panel 610 may be interconnected to the first, or front, panel 606 as well.

While the preferred embodiments of the invention have been shown and described, it will be apparent to those skilled in the art that changes and modifications may be made therein without departing from the spirit of the invention, the scope of which is defined by the appended claims.

What is claimed is:

1. A compact disc folder in the form of a booklet, the folder comprising: a cover portion formed from a paperboard blank and at least one internal booklet portion, the booklet portion having a plurality of pages and the cover portion covering the booklet portion, the cover portion including a front cover panel, a rear cover panel and a spine panel interconnecting the front and rear cover panels, said folder further including a first interior panel overlying said front cover panel to define first interior pocket of said folder, the first interior pocket being dimensioned to receive a compact disc therein and defining a disc-receiving pocket of said folder, said first interior panel including a preformed access opening formed in one edge thereof that facilitates the insertion and removal of said compact disc into said first interior pocket, said first interior pocket access opening being disposed along an exterior edge of said folder when said first interior panel is folded upon said front cover panel, said booklet portion being supported on said cover portion between said front and rear cover panels and adjacent to said spine panel such that said booklet portion pages are covered by said front and rear cover panels when said folder is in a closed condition.

2. The compact disc folder of claim 1, further including a second interior panel overlying said rear cover panel to define a second interior pocket of said folder.

3. The compact disc folder of claim 2, wherein said second interior pocket supports a portion of said booklet portion.

4. The compact disc folder of claim 1, wherein said booklet has a predetermined thickness and said spine panel has a predetermined width that is slightly greater than said booklet predetermined thickness.

5. The compact disc folder of claim 3, wherein said first interior panel is separated from said front cover panel by a first foldline and said second interior pocket panel is separated from said rear cover by a second foldline.

6. The compact disc folder of claim 5, wherein said first and second foldlines are angularly offset from each other.

7. The compact disc folder of claim 5, wherein said spine panel is defined by a pair of spine panel foldlines, said spine foldlines being generally parallel to one of said first and second foldlines.

8. The compact disc folder of claim 5, wherein one of said first and second foldlines is generally parallel with a baseline of said foldline.

9. The compact disc folder of claim 1, wherein said interior pocket panel is adhesively attached to said front cover panel.

10. The compact disc folder of claim 2, wherein said second interior panel is adhesively attached to said rear cover panel.

11. A folder for a compact disc, the folder having a shape in the form of a booklet, said folder comprising:
a cover portion including first and second cover panels separated by at least a first foldline, the first and second cover panels forming front and rear covers of said folder when folded upon the first foldline;
first and second interior panels that are respectively associated with said first and second cover panels, the first interior panel being separated from said first cover panel by a second foldline and the second interior panel being separated from said second cover panel by a third foldline, said first interior panel overlying said first cover panel and defining therebetween a first pocket of said folder, the first pocket being dimensioned to receive therein a compact disc, said first interior panel including an access opening for said first pocket that is formed along one edge thereof, said first interior panel edge being generally parallel to said second foldline and offset from said third foldline such that said access opening lies along an outer edge of said folder, said second interior pocket overlying said second cover panel and defining therebetween a second pocket of said folder, said first and second pockets being covered by said first and second cover panels when said folder is in a closed condition.

12. The compact disc folder of claim 11, further including a booklet portion disposed between said first and second cover panels when said folder is in a closed condition.

13. The compact disc folder of claim 11, wherein one of said second and third foldlines is parallel to said first foldline.

14. The compact disc folder of claim 11, wherein one of said second and third foldlines is offset with respect to said first foldline.

15. The compact disc folder of claim 11, further including a spine panel interposed between said first and second panels, the spine panel being defined by said first foldline and an additional foldline generally parallel to and spaced apart from said first foldline.

16. The compact disc folder of claim 11, wherein said second pockets includes an access opening, and said first and second packet openings are offset with respect to each other.

17. The compact disc folder of claim 12, further including a spine panel interposed between said first and second panels, the spine panel being defined by said first foldline and an additional foldline parallel to and spaced from said first foldline.

18. The compact disc folder of claim 17, wherein said booklet has a predetermined thickness and said spine panel has a predetermined width that is slightly greater than said booklet predetermined thickness.

* * * * *